US012089022B2

(12) United States Patent
Ishigaki et al.

(10) Patent No.: US 12,089,022 B2
(45) Date of Patent: Sep. 10, 2024

(54) PANEL-TYPE SPEAKER

(71) Applicant: DENSO TEN Limited, Kobe (JP)

(72) Inventors: Shizuka Ishigaki, Kobe (JP); Hironori Shiroto, Kobe (JP); Yutaka Matsunami, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 18/339,643

(22) Filed: Jun. 22, 2023

(65) Prior Publication Data

US 2023/0336917 A1 Oct. 19, 2023

Related U.S. Application Data

(62) Division of application No. 17/485,929, filed on Sep. 27, 2021, now abandoned.

(30) Foreign Application Priority Data

May 24, 2021 (JP) ................................ 2021-086808
Aug. 20, 2021 (JP) ................................ 2021-134511

(51) Int. Cl.

| | |
|---|---|
| ***H04R 3/00*** | (2006.01) |
| ***H04R 1/22*** | (2006.01) |
| ***H04R 7/04*** | (2006.01) |
| ***H04R 17/10*** | (2006.01) |

(52) U.S. Cl.
CPC ............... *H04R 7/045* (2013.01); *H04R 1/22* (2013.01); *H04R 3/007* (2013.01); *H04R 17/10* (2013.01); *H04R 2440/05* (2013.01)

(58) Field of Classification Search
CPC .... H04R 17/00; H04R 17/10; H04R 7/04–10; H04R 7/045; H04R 1/22; H04R 3/007; H04R 2440/05
See application file for complete search history.

(56) References Cited

FOREIGN PATENT DOCUMENTS

| | | | | | |
|---|---|---|---|---|---|
| CN | 101742386 | A | | 6/2010 | |
| JP | 2001258096 | A | * | 9/2001 | |
| JP | 2008092518 | A | | 4/2008 | |
| JP | 2010-171927 | A | | 8/2010 | |
| WO | WO-2005006809 | A1 | * | 1/2005 | ............ H04R 17/00 |

OTHER PUBLICATIONS

English machine translation of WO2005006809 (Kakegawa, Seimei; Piezoelectric Vibration Generator and Vibratory Sound Transmitter; published Jan. 2005) (Year: 2005).*
English machine translation of JP2001258096 (Tsutsumi, Shigeru; Manufacturing Method for Piezoelectric Diaphragm for Loudspeaker; published Sep. 2001) (Year: 2001).*

* cited by examiner

*Primary Examiner* — Mark Fischer
(74) *Attorney, Agent, or Firm* — Oliff PLC

(57) ABSTRACT

A panel-type speaker includes a panel and an actuator and is configured to vibrate the panel by the actuator so as to output sound waves from the panel, the actuator includes: a vibrating plate; and a piezoelectric element arranged on at least one surface of the vibrating plate, the piezoelectric element has, at a central portion of the piezoelectric element in a plan view, an opening from which the vibrating plate is exposed, and at a portion of the vibrating plate exposed from the opening, the vibrating plate is coupled to the panel.

4 Claims, 22 Drawing Sheets

PANEL-TYPE SPEAKER

CROSS-REFERENCE TO RELATED APPLICATION

This application is a divisional application of U.S. application Ser. No. 17/485,929 filed on Sep. 27, 2021 which claims priority under 35 USC 119 from Japanese Patent Application No. 2021-086808 filed on May 24, 2021 and Japanese Patent Application No. 2021-134511 filed on Aug. 20, 2021.

TECHNICAL FIELD

The present invention relates to a panel-type speaker.

BACKGROUND ART

Display speakers (panel-type speakers) have been known, in which a display is used as a speaker by vibrating a display panel of the display using an actuator (vibration actuator) in which a piezoelectric element is employed. In the display speakers, a vibration transmission unit is provided between the vibration actuator and the display panel. The vibration transmission unit is adhered, for example, to a rear surface of the display panel by a double-sided adhesive tape and the like. Also, the vibration transmission unit is adhered, for example, to a central portion of the piezoelectric element of the vibration actuator by a double-sided adhesive tape and the like. Therefore, the vibration transmission unit can transmit vibration of the vibration actuator to the display panel.

JP-A-2010-171927 discloses a conventional speaker.

SUMMARY OF INVENTION

When the piezoelectric element of the vibration actuator adhered to the vibration transmission unit vibrates, stress may be applied to the piezoelectric element, thereby causing the piezoelectric element to be damaged.

Also, when the display panel is vibrated by the vibration actuator, sound pressure at a specific frequency (resonance frequency) may become stronger due to resonance between the vibration actuator and the display panel. As the display speaker, it is desirable that an appropriate frequency characteristic can be obtained in the entire output frequency band, rather than a part of the frequency protruding. However, a resonance frequency is eventually determined by the surrounding configurations such as the size of the vibration actuator, the size of the display panel, and a housing of the display panel, and it was difficult to adjust the resonance frequency arbitrarily.

A first object of the present invention is to provide a panel-type speaker in which damage to a piezoelectric element is reduced.

A second object of the present invention is to provide a technique capable of appropriately setting a resonance frequency of an actuator.

To attain the first object, according to a first aspect of the invention, there is provided a panel-type speaker which includes a panel and an actuator and is configured to vibrate the panel by the actuator so as to output sound waves from the panel, the actuator including: a vibrating plate; and a piezoelectric element arranged on at least one surface of the vibrating plate, wherein the piezoelectric element has, at a central portion of the piezoelectric element in a plan view, an opening from which the vibrating plate is exposed, and at a portion of the vibrating plate exposed from the opening, the vibrating plate is coupled to the panel.

To attain the second object, according to a second aspect of the invention, there is provided a panel-type speaker which includes a panel and an actuator and is configured to vibrate the panel by the actuator so as to output sound waves from the panel, the speaker including: a vibration transmission unit which has one end connected to the panel and other end connected to the actuator and is configured to transmit a vibration of the actuator to the panel; and a restraint unit configured to restrain the actuator to the vibration transmission unit, wherein the actuator includes a vibrating plate; and a piezoelectric element arranged on at least one surface of the vibrating plate, wherein a length of a portion of the restraint unit along a specific direction is set to a predetermined length so that a resonance frequency of a bending vibration propagating in the specific direction in a plane of the vibrating plate becomes a predetermined frequency.

According to the first aspect of the invention, the panel-type speaker in which damage to a piezoelectric element is reduced can be provided.

According to the second aspect of the invention, the technique capable of appropriately setting a resonance frequency of an actuator can be provided.

DETAILED DESCRIPTION OF THE INVENTION

Hereinafter, embodiments of the present invention will be described with reference to the accompanying drawings. Configurations of the following embodiments are illustrated by way of example, and accordingly, the present invention is not limited to the configurations of the embodiments.

Herein, a panel-type speaker in which a panel is vibrated by an actuator to output sound waves from the panel will be described. In the following embodiments, a case where a vibration actuator is provided on a display panel of a display and thus the display functions as a display speaker will be mainly described. The display speaker is a device that can output (emit) sound waves from the display panel by vibrating the display panel using the vibrating actuator (actuator).

First Embodiment

Configuration Example

Figure 1:
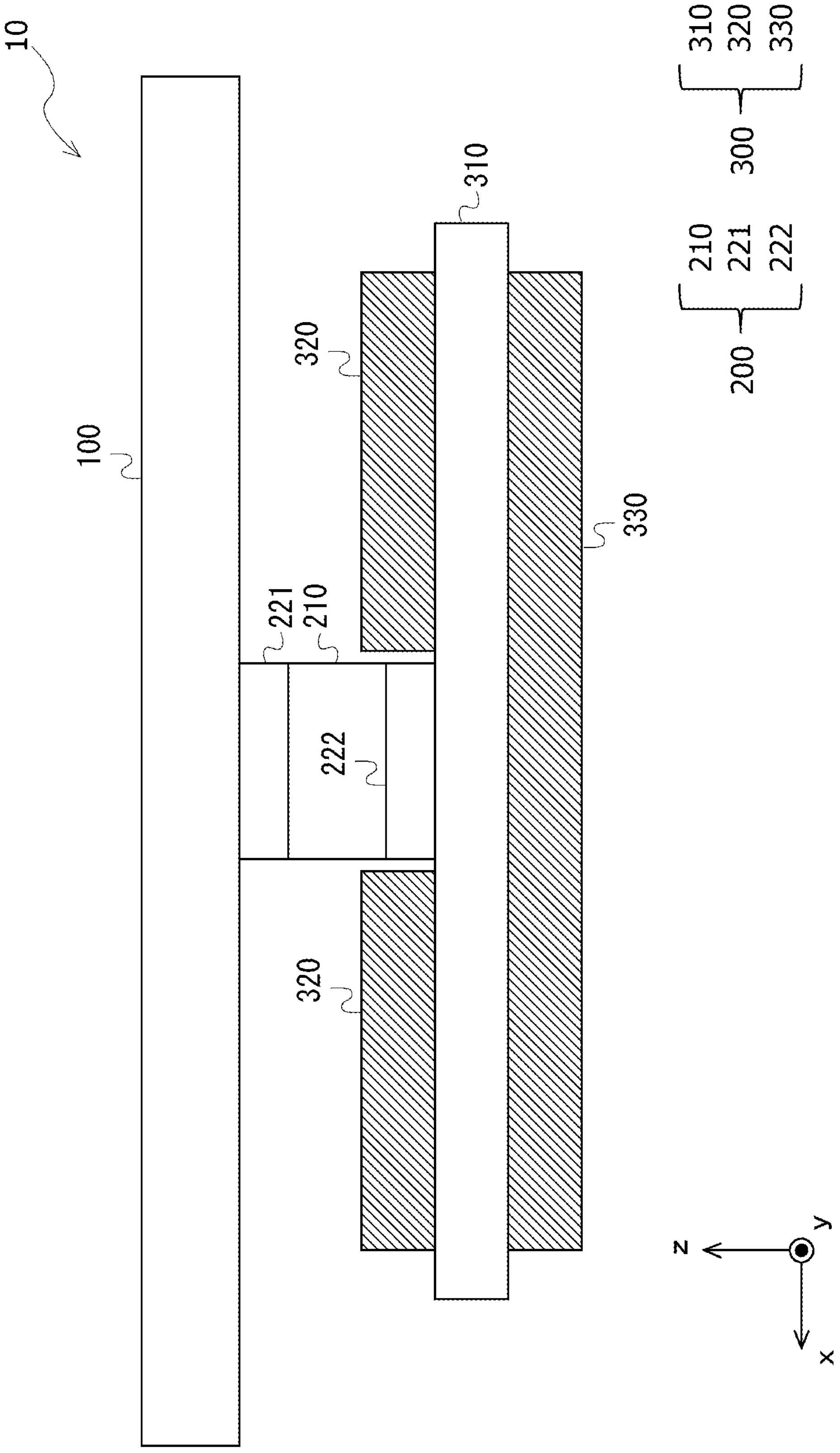
FIG. 1 is a view showing a configuration example of a display speaker 10 of a first embodiment.

FIG. 1 is a view showing a configuration example of a display speaker 10 of the present embodiment. FIG. 1 is a sectional view of the display speaker 10 as viewed from above. The display speaker 10 of FIG. 1 includes a display panel 100, a vibration transmission unit 200 and a vibration actuator 300. The vibration transmission unit 200 includes a body portion 210, a double-sided adhesive tape 221 on a side thereof facing the display panel, and a double-sided adhesive tape 222 on a side thereof facing the vibration actuator. The vibration actuator 300 includes a vibrating plate 310, a piezoelectric element 320 adhered to a surface of the vibrating plate 310 facing the display panel (referred to as a first surface), and a piezoelectric element 330 adhered to a surface of the vibrating plate 310 opposite to the first surface (referred to as a second surface). A plurality of vibration transmission units 200 and vibration actuators 300 may be attached to one display panel 100. Here, a direction from the right to the left of FIG. 1 is referred to as an x-direction, a direction from a back surface to a front surface of the paper plane of FIG. 1 is referred to as a y-direction, and a direction from the bottom to the top of FIG. 1 (a direction from the vibration actuator 300 to the display panel 100) is referred to as a z-direction. The positional relationship between the display speaker 10 and the x-, y- and z-directions is similarly applied to the other figures. The display panel 100 is an example of a panel. The display speaker is an example of a panel-type speaker. The vibration actuator 300 is an example of an actuator.

The display panel 100 is a display panel included in a liquid crystal monitor, an organic EL (Electro-Luminescence) display and the like.

The vibration transmission unit 200 is configured to transmit vibration of the vibration actuator 300 to the display panel 100. For example, the body portion 210 of the vibration transmission unit 200 is a columnar object (e.g., a quadrangular column, a circular column or the like) and has upper and lower surfaces substantially parallel to each other. For example, the vibration transmission unit 200 is made of resin, metal or the like. The double-sided adhesive tape 221 is adhered to one of the upper and lower surfaces, and the double-sided adhesive tape 222 is adhered to the other surface. Herein, it is assumed that the double-sided adhesive tape 221 is adhered to the upper surface and the double-sided adhesive tape 222 is adhered to the lower surface. The double-sided adhesive tape 221 is configured to adhere and fix the body portion 210 of the vibration transmission unit 200 to a rear surface of the display panel 100. The double-sided adhesive tape 222 is configured to adhere and fix the body portion 210 of the vibration transmission unit 200 to the vibrating plate 310 of the vibration actuator 300. The vibration transmission unit 200 is fixed to the vibrating plate 310 without coming in contact with the piezoelectric element 320. The vibration transmission unit 200 is fixed between the display panel 100 and the vibration actuator 300 by the double-sided adhesive tapes 221, 222. Instead of the double-sided adhesive tapes 221, 222, adhesive and the like may be employed. The vibration transmission unit 200 and the display panel 100 may be integrated. The vibrating plate 310 of the vibration actuator 300 is coupled to the display panel 100 via the vibration transmission unit 200.

The vibrating plate 310 of the vibration actuator 300 is a rectangular plate-shaped member and has a front surface (first surface) and a back surface (second surface) extending in a direction orthogonal to a thickness direction thereof. The shape of the vibrating plate 310 may be circular or elliptical. Also, the shape of the vibrating plate 310 may have another shape as long as it is laterally and vertically symmetrical. The front surface is substantially parallel to the back surface. Further, the vibrating plate 310 is arranged such that the front surface of the vibrating plate 310 is substantially parallel to the rear surface of the display panel 100. The piezoelectric elements 320, 330 are elements configured such that when a voltage is applied thereto, a shape thereof is deformed in response to the voltage. The piezoelectric elements 320, 330 are elements made of a plate-shaped material, such as ceramic, which exhibits a piezoelectric effect. The piezoelectric elements 320, 330 have an electrode attached thereto for applying a voltage. The piezoelectric element 320 is adhered to the first surface of the vibrating plate 310. The piezoelectric element 330 is adhered to the second surface of the vibrating plate 310. The piezoelectric element 320 has an opening formed to expose a central portion of the vibrating plate 310 as viewed from the first surface side. The piezoelectric element 320 has an opening in a central portion thereof. The vibrating plate 310 has a portion (exposed portion) exposed at the central portion of the first surface of the vibrating plate 310 by the opening of the piezoelectric element 320. The double-sided adhesive tape 222 on the vibration transmission unit 200 is adhered to the opening, so that the vibrating plate 310 and the vibration transmission unit 200 are adhered to each other. At this time, the piezoelectric element 320 and the vibration transmission unit 200 do not come into contact with each other. On the other hand, the piezoelectric element 330 may not be adhered to the vibrating plate 310 (alternatively, the piezoelectric element 330 may not be provided). The first and second surfaces are on the x-y plane.

Figure 2:
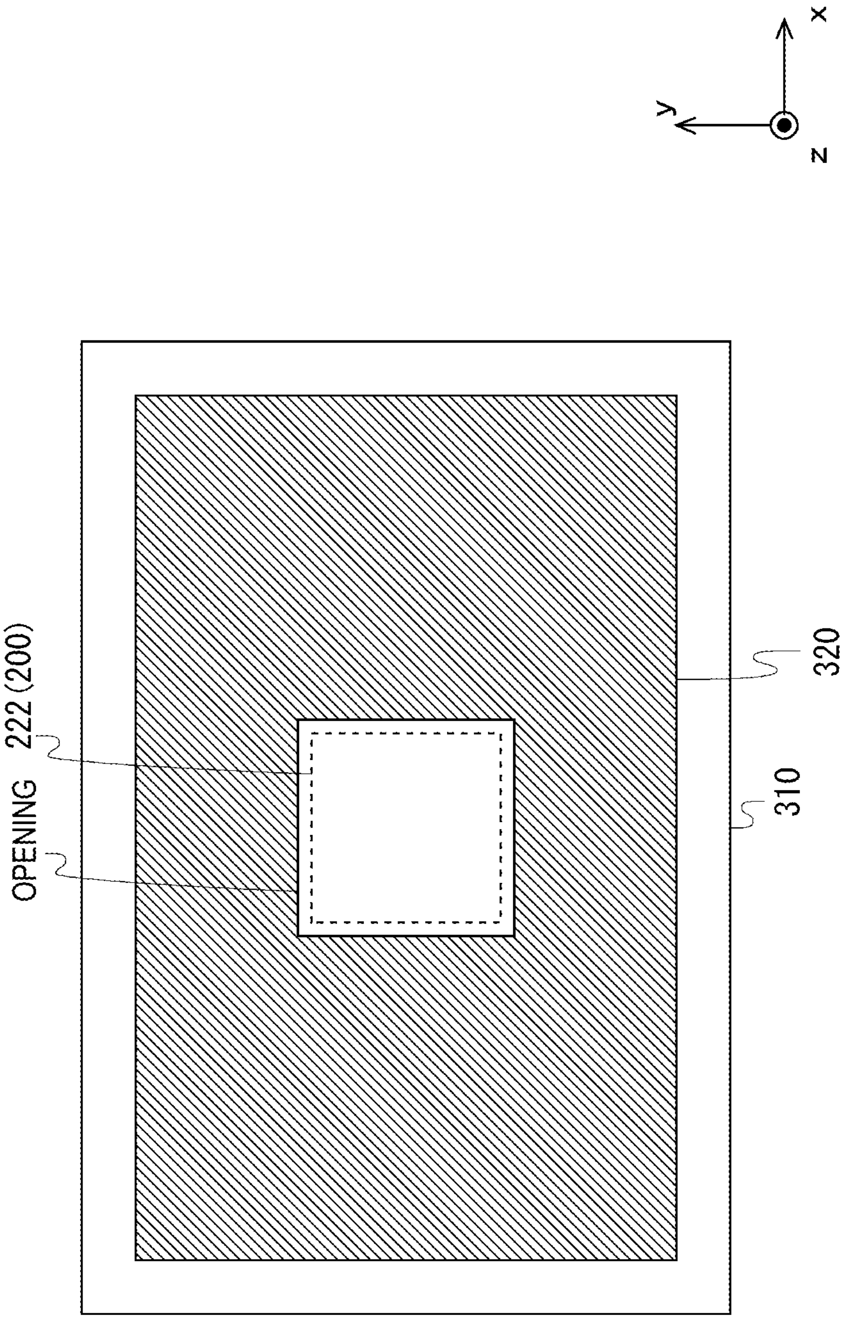
FIG. 2 is a view showing a configuration example of a vibration actuator 300 of the first embodiment.

FIG. 2 is a view showing a configuration example of the vibration actuator 300 of the present embodiment. FIG. 2 is a view of the vibration actuator 300 as viewed from the first surface side. The piezoelectric element 320 having the opening is adhered to the first surface of the vibrating plate 310 of the vibration actuator 300. Also, the central portion of the vibrating plate 310 (a portion including the center of the first surface, the central portion in a plan view) is exposed through the opening of the piezoelectric element 320. Herein, if the shape of the vibrating plate 310 is rectangular, the center of the first surface (or the second surface) of the vibrating plate 310 is an intersection point of two diagonal lines of the rectangle. Further, if the shape of the vibrating plate 310 is circular or elliptical, the center of the first surface (or the second surface) of the vibrating plate 310 is the center of the circle or ellipse. Even if the vibrating plate 310 have any other shapes, the center of the first surface (or the second surface) of the vibrating plate 310 can be defined by, for example, a center of gravity thereof or the like. A size of the opening of the piezoelectric element 320 (a size of the exposed portion of the vibrating plate 310) is larger than a size of the lower surface of the body portion 210 of the vibration transmission unit 200 adhered to the vibrating plate 310 (a portion encircled by a dotted line in FIG. 2). Therefore, the piezoelectric element 320 and the vibration transmission unit 200 do not come into contact with each other. Herein, although the shape of the opening of the piezoelectric element 320 is rectangular (or square), the shape may be circular or the like in accordance with the shape of the vibration transmission unit 200. In order to increase an area of the piezoelectric element 320, it is preferable to make the size of the opening of the piezoelectric element 320 as small as possible. By increasing the area of the piezoelectric element 320, it is possible to make the output (maximum output) of the display speaker 10 larger. Also, as viewing the vibration actuator 300 from the first surface side, an outer end of the piezoelectric element 320 is preferably positioned inward of an end of the vibrating plate 310. If the outer end of the piezoelectric element 320 is positioned outward of the end of the vibrating plate 310, the piezoelectric element 320 is apt to be damaged. This feature is similarly applied to the piezoelectric element 330 to be adhered to the second surface of the vibrating plate 310.

(First Variant)

Now, a first variant of the present embodiment will be described. Some of configurations of the first variant are common with those of the foregoing configuration example. Herein, differences from the foregoing configuration example will be mainly described.

Figure 3:
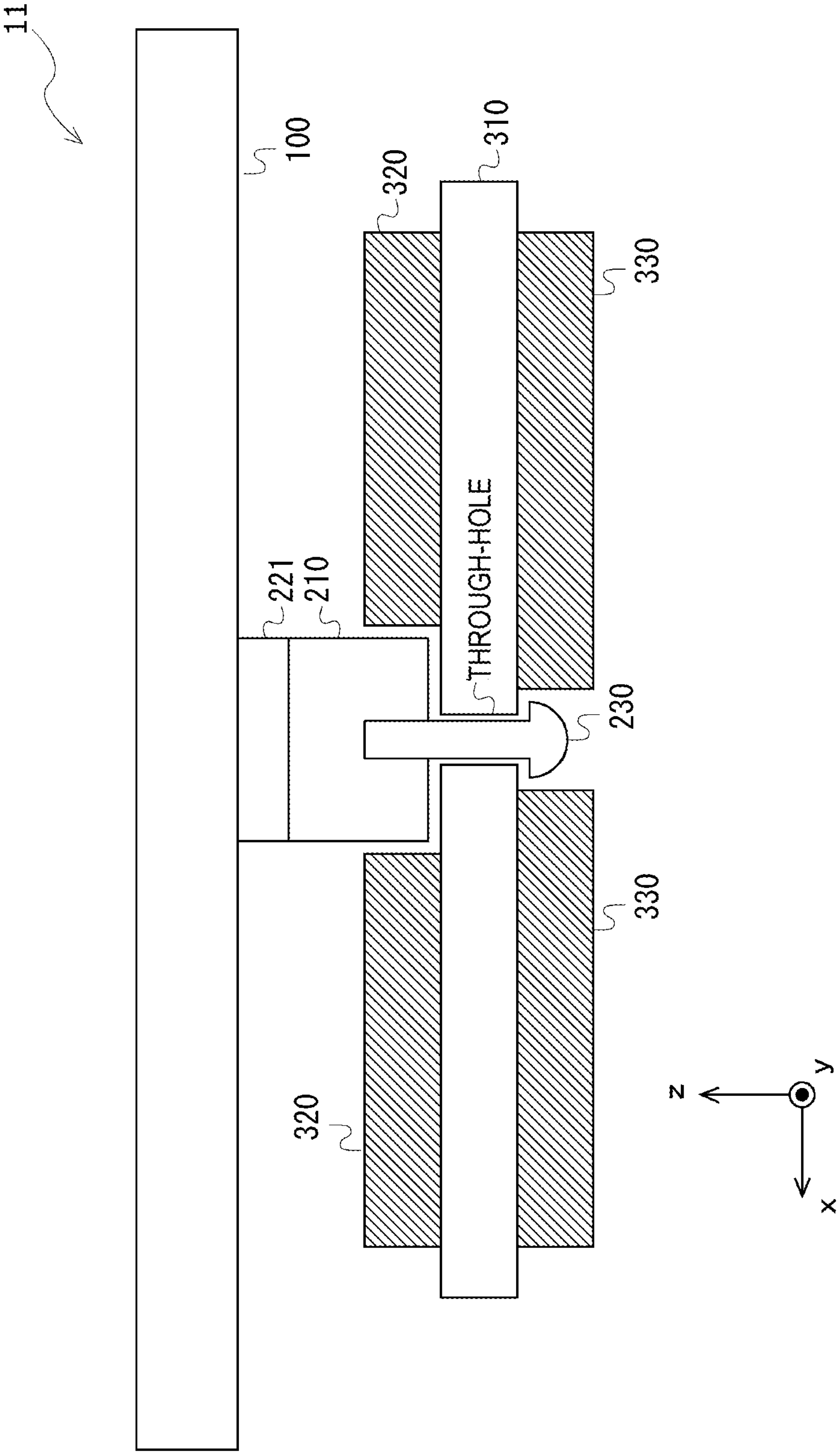
FIG. 3 is a view showing a configuration example of a display speaker 11 of a first variant.

FIG. 3 is a view showing a configuration example of a display speaker 11 of the first variant. FIG. 3 is a sectional view of the display speaker 11 as viewed from above. The display speaker 11 of FIG. 3 includes a display panel 100, a vibration transmission unit 200 and a vibration actuator 300. The vibration transmission unit 200 includes a body portion 210, a double-sided adhesive tape 221 on a side thereof facing the display panel, and a screw 230. The vibration actuator 300 includes a vibrating plate 310, a piezoelectric element 320, and a piezoelectric element 330. The vibrating plate 310 has a through-hole at a central portion thereof. The center of the through-hole coincides with the center of the vibrating plate 310. For example, a cross-sectional shape of the through-hole is circular. The vibration transmission unit 200 and the display panel 100 may be integrated.

Figure 4:
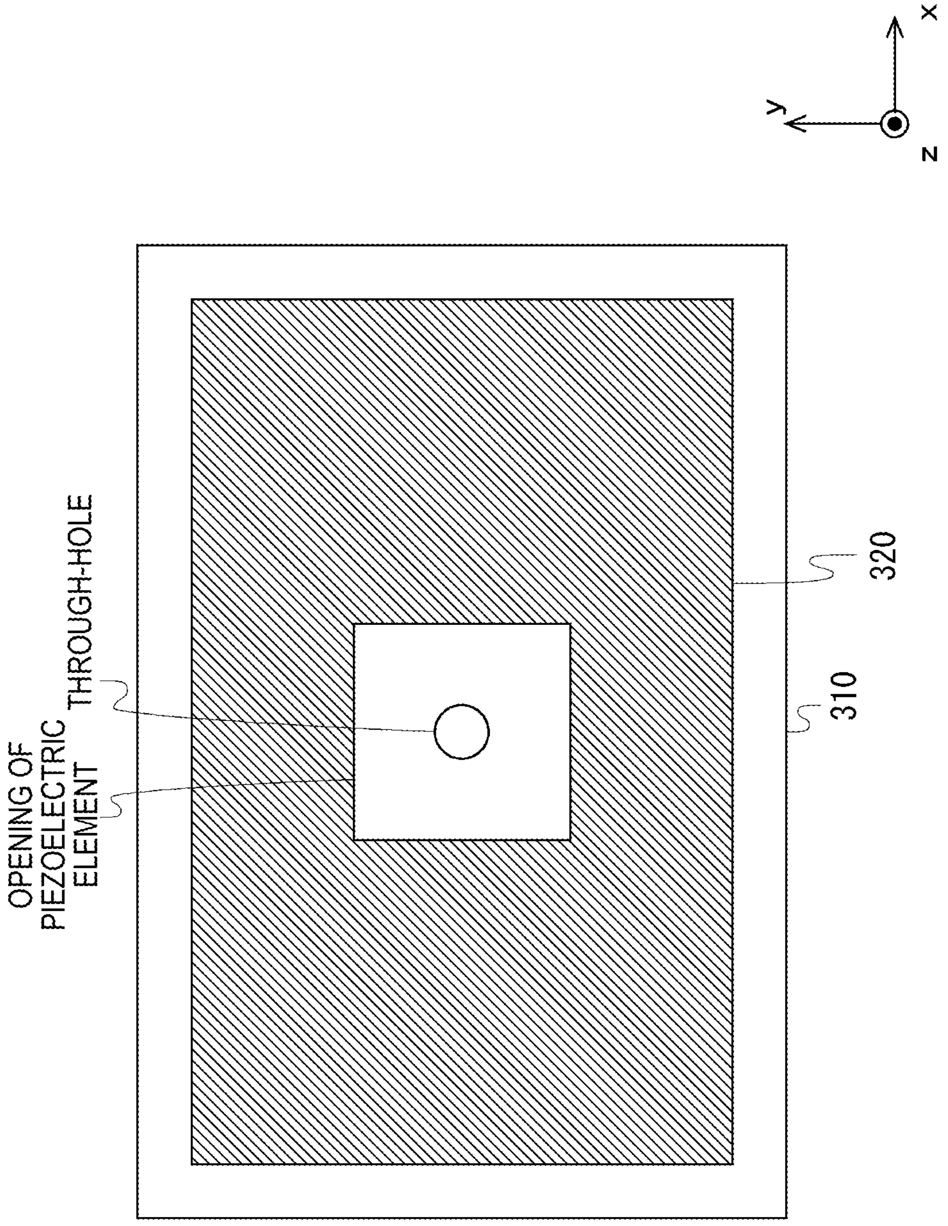
FIG. 4 is a view showing a configuration example of a vibration actuator 300 of the first variant.

FIG. 4 is a view showing a configuration example of the vibration actuator 300 of the first variant. FIG. 4 is a view of the vibration actuator 300 as viewed from the first surface side. At the central portion of the vibrating plate 310 of the vibration actuator 300, a through-hole is formed to allow the screw 230 to pass therethrough. At a central portion of the piezoelectric element 320, an opening is provided to expose the through-hole of the vibrating plate 310.

In the foregoing configuration example, the vibration transmission unit 200 and the vibration actuator 300 are fixed to each other by the double-sided adhesive tape 222. However, in the first variant, the vibration transmission unit 200 and the vibration actuator 300 are fixed to each other by the screw 230. In the first variant, the vibrating plate 310 has, at the central portion thereof, the through-hole allowing the screw 230 to pass therethrough. Further, similarly to the piezoelectric element 320, the piezoelectric element 330 adhered to a second surface of the vibrating plate 310 has an opening exposing a central portion of the second surface of the vibrating plate 310. Further, the body portion 210 of the vibration transmission unit 200 has a threaded hole formed on a side thereof facing the vibration actuator 300 and configured to allow the screw 230 to be fixed therein. When fixing the vibration actuator 300 to vibration transmission unit 200, the screw 230 is inserted through the through-hole from the second surface side of the vibrating plate 310, and is then screwed into the body portion 210 of the vibration transmission unit 200 positioned on the first surface side. That is, the vibration actuator 300 is coupled to the display panel 100 via the vibration transmission unit 200 by the screw 230. Therefore, the vibration actuator 300 and the display panel 100 are strongly fixed (coupled) to each other, as compared with the case of fixing by the double-sided adhesive tape 222. Also, the durability is increased, as compared with the case of fixing by the double-sided adhesive tape 222. Instead of the screw 230, a bolt and a nut may be employed.

(Second Variant)

Now, a second variant of the present embodiment will be described. Some of configurations of the second variant are common with those of the foregoing configuration example and variant. Herein, differences from the foregoing configuration example and variant will be mainly described.

Figure 5:
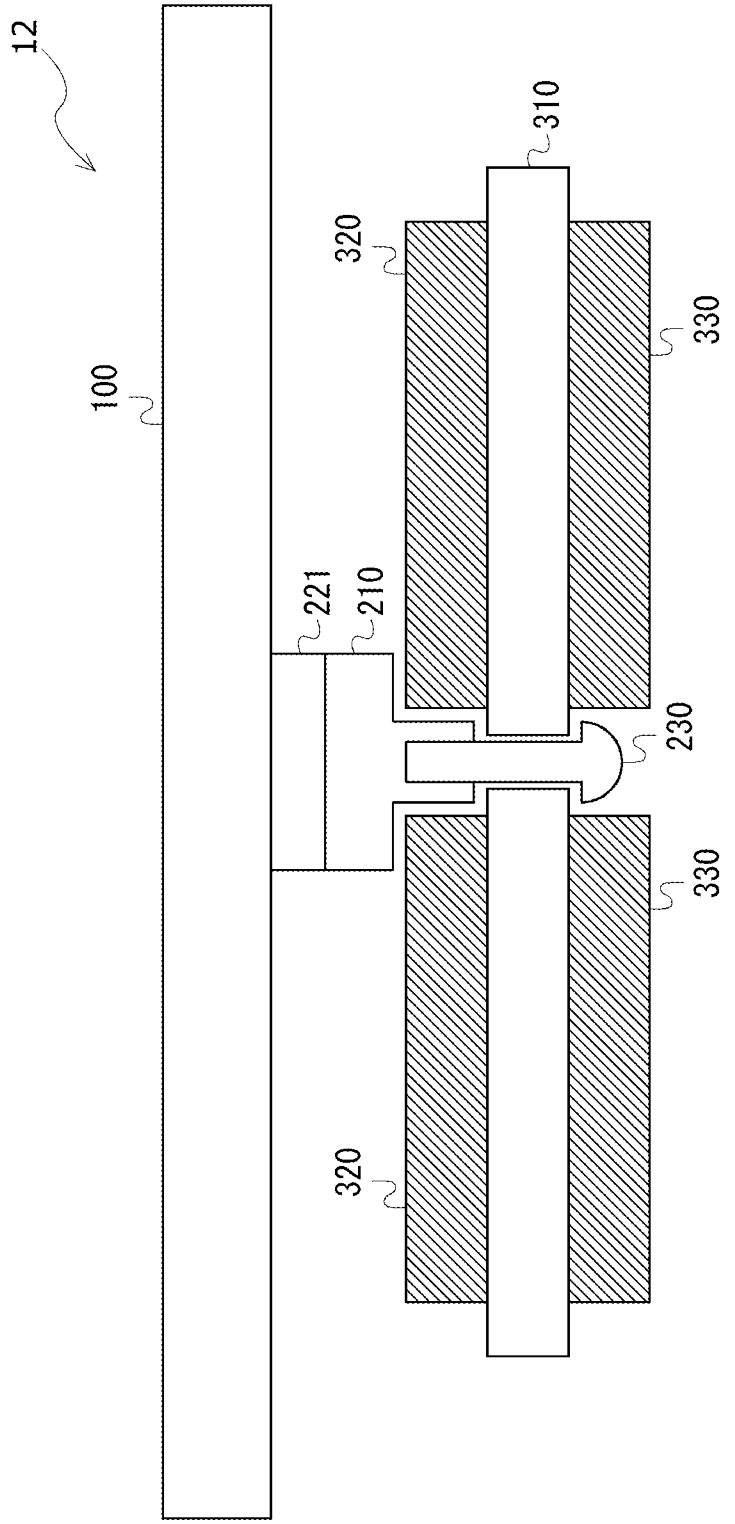
FIG. 5 is a view showing a configuration example of a display speaker 12 of a second variant.

FIG. 5 is a view showing a configuration example of a display speaker 12 of the second variant. FIG. 5 is a sectional view of the display speaker 12 as viewed from above. The display speaker 12 of FIG. 5 includes a display panel 100, a vibration transmission unit 200 and a vibration actuator 300. The vibration transmission unit 200 includes a body portion 210, a double-sided adhesive tape 221 on a side thereof facing the display panel, and a screw 230. The vibration actuator 300 includes a vibrating plate 310, a piezoelectric element 320, and a piezoelectric element 330. The vibrating plate 310 has a through-hole at a central portion thereof. The vibration transmission unit 200 and the display panel 100 may be integrated. Like the first variant, the second variant has a configuration in which the vibration transmission unit 200 and the vibration actuator 300 are fixed to each other by a screw 230. In the second variant, a side of the body portion 210 of the vibration transmission unit 200 facing the vibration actuator 300 has a smaller size in order to make an area of the piezoelectric element 320 larger. The side of the body portion 210 of the vibration transmission unit 200 facing the vibration actuator 300 is set to have a size allowing the screw 230 to be supported thereon. On the other hand, it is preferable that a side of the body portion 210 of the vibration transmission unit 200 facing the display panel 100 has a larger size. The reason is that the smaller an area of adhered surfaces between the display panel 100 and the vibration transmission unit 200, the larger a possibility that the vibration transmission unit 200 is separated from the display panel 100. Herein, the body portion 210 of the vibration transmission unit 200 has such a shape that the body portion 210 does not come into contact with the piezoelectric element 320. A length, in the z-direction, of a side of the body portion 210 facing the vibration actuator 300 (a portion thereof smaller than the side facing the display panel 100) is longer than a thickness of the piezoelectric element 320 (a length thereof in the z-direction). Therefore, the vibration transmission unit 200 and the piezoelectric element 320 do not come into contact with each other.

Figure 6:
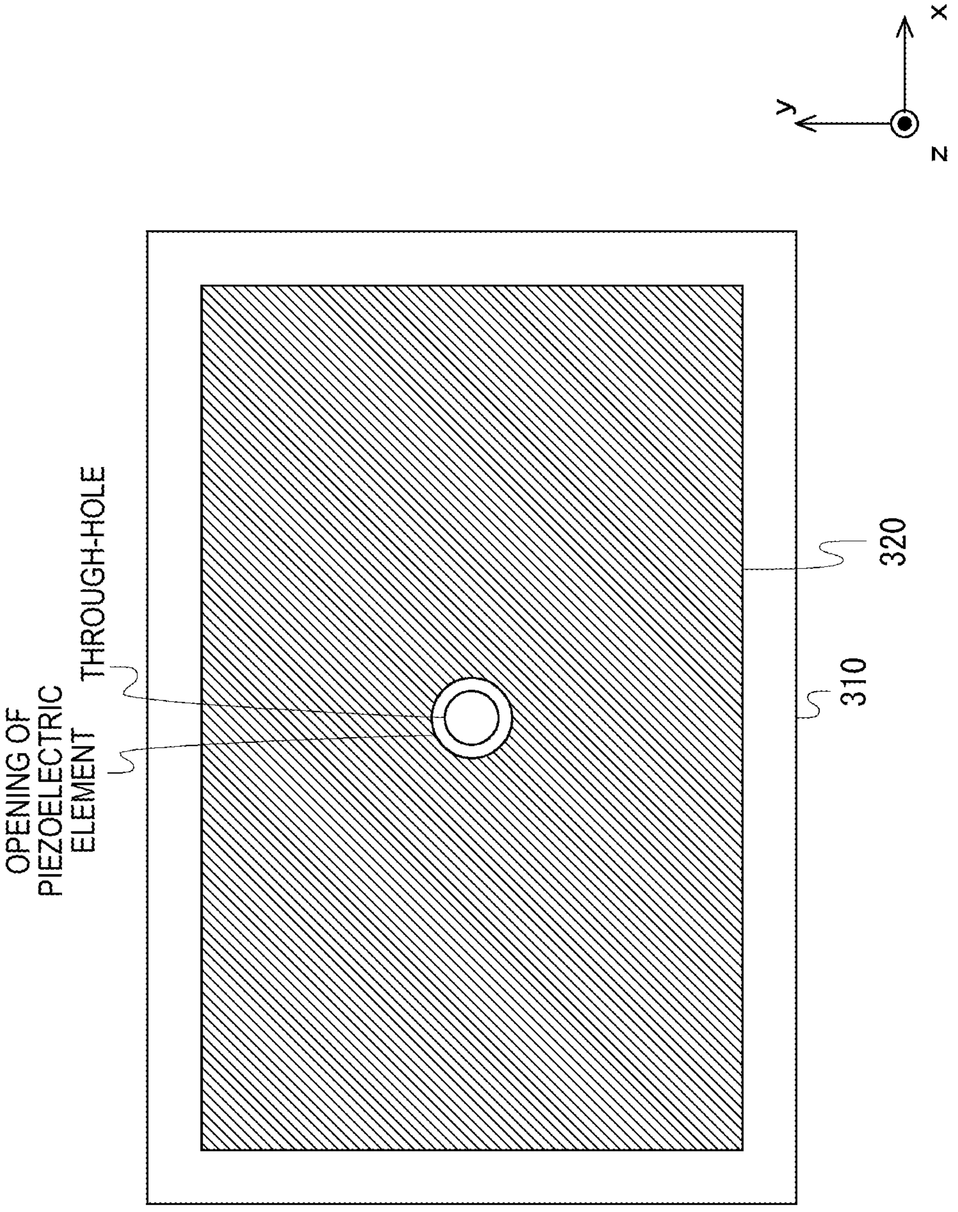
FIG. 6 is a view showing a configuration example of a vibration actuator 300 of the second variant.

FIG. 6 is a view showing a configuration example of the vibration actuator 300 of the second variant. FIG. 6 is a view of the vibration actuator 300 as viewed from the first surface side. An exposed portion of the vibrating plate 310 of the vibration actuator 300 of the second variant is smaller than an exposed portion of the vibrating plate 310 of the first variant. Accordingly, an area of the piezoelectric element 320 of the second variant is larger than an area of the piezoelectric element 320 of the first variant. Therefore, it is possible to make the output (maximum output) of the display speaker 12 larger.

(Third Variant)

Now, a third variant of the present embodiment will be described. Some of configurations of the third variant are common with those of the foregoing configuration example and variants. Herein, differences from the foregoing configuration example and variants will be mainly described.

Figure 7:
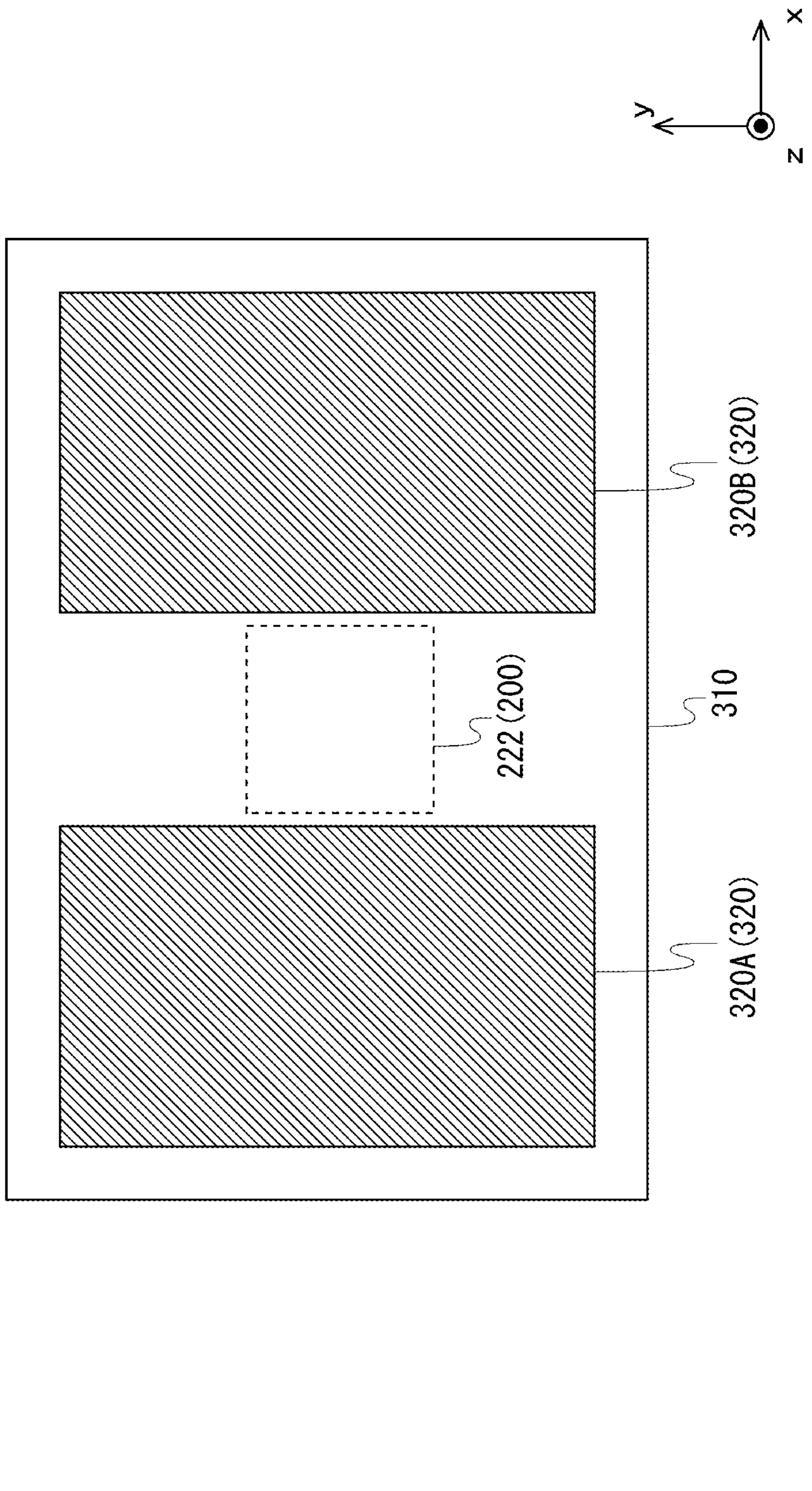
FIG. 7 is a view showing a configuration example of a vibration actuator 300 of a third variant.

FIG. 7 is a view showing a configuration example of a vibration actuator 300 of the third variant. FIG. 7 is a view of the vibration actuator 300 as viewed from the first surface side. In the vibration actuator 300 of the third variant, the piezoelectric element 320 is divided into two piezoelectric elements 320A, 320B. Further, the piezoelectric elements 320A, 320B are adhered to a vibrating plate 310 in such a way to be positioned aside from the exposed portion of the vibrating plate 310, to which a vibration transmission unit 200 is to be adhered. The piezoelectric elements 320A, 320B are adhered to portions other than the exposed portion of the vibrating plate 310, to which the vibration transmission unit 200 is to be adhered. Herein, although two piezoelectric elements are adhered to the first surface of the vibrating plate 310, two or more piezoelectric elements may be adhered thereto.

Therefore, it is not necessary to provide an opening in the piezoelectric element 320, thereby making processing of the piezoelectric element 320 easy. Also, this feature is similarly applied to the piezoelectric element 330 to be adhered to the second surface of the vibrating plate 310.

(Fourth Variant)

Now, a fourth variant of the present embodiment will be described. Some of configurations of the fourth variant are common with those of the foregoing configuration example and variants. Herein, differences from the foregoing configuration example and variants will be mainly described.

Figure 8:
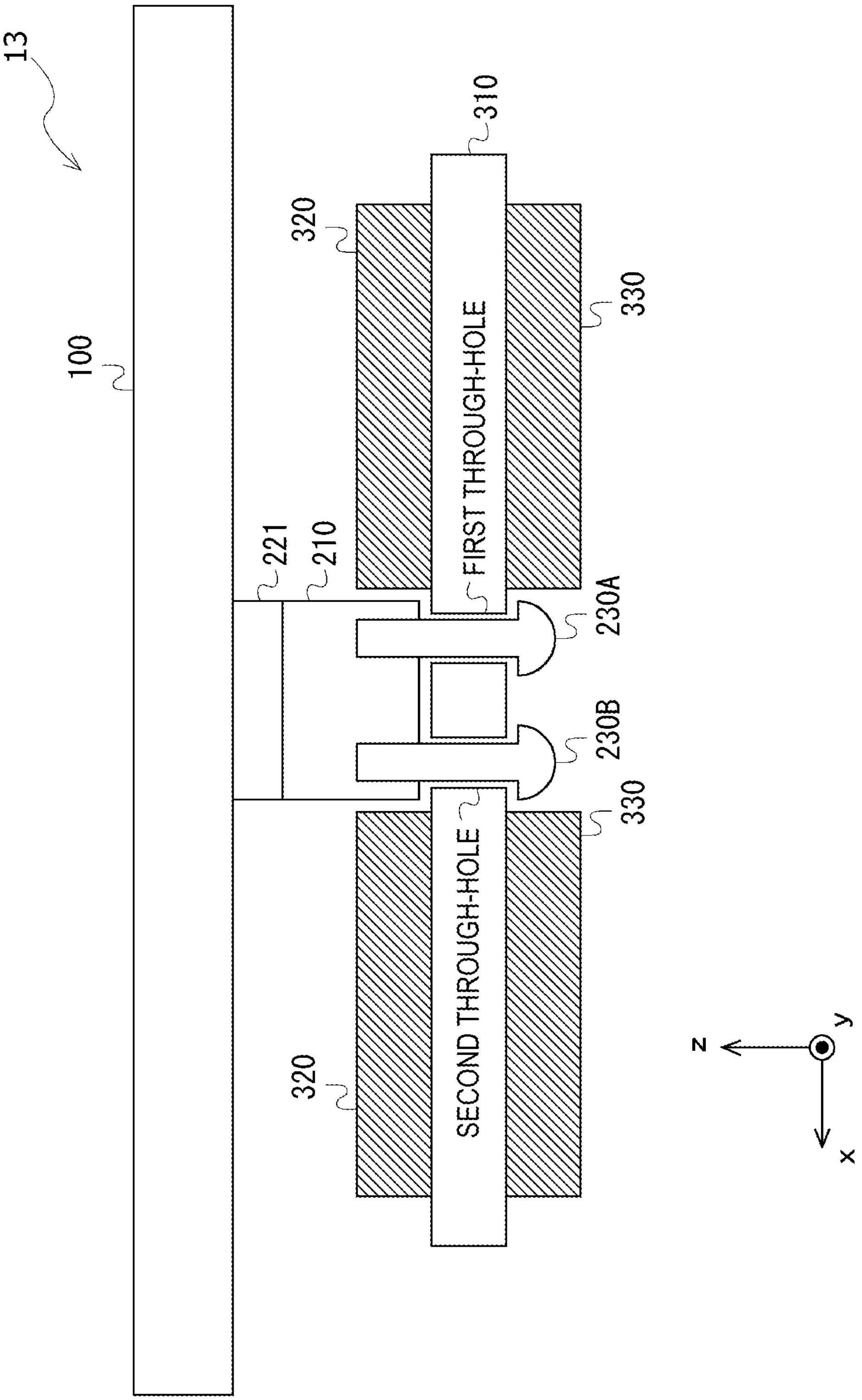
FIG. 8 is a view showing a configuration example of a display speaker 13 of a fourth variant.

FIG. 8 is a view showing a configuration example of a display speaker 13 of the fourth variant. FIG. 8 is a sectional view of the display speaker 13 as viewed from above. The display speaker 13 of FIG. 8 includes a display panel 100, a vibration transmission unit 200 and a vibration actuator 300. The vibration transmission unit 200 includes a body portion 210, a double-sided adhesive tape 221 on a side thereof facing the display panel, a first screw 230A and a second screw 230B. The vibration actuator 300 includes a vibrating plate 310, a piezoelectric element 320, and a piezoelectric element 330. The vibrating plate 310 has a first through-hole and a second through-hole at a central portion thereof. The center of the first through-hole and the center of the second through-hole are located on a straight line extending through the center of the vibrating plate 310 and parallel to the x-direction. A distance from the center of the first through-hole to the center of the vibrating plate 310 is equal to a distance from the center of the second through-hole to the center of the vibrating plate 310. For example, if the distance from the center of the through-holes to the center of the vibrating plate 310 is shorter than a distance from the center of the through-holes to an end portion of the vibrating plate 310 closest thereto, it is considered that the through-holes are located in a central portion of the vibrating plate 310. Also, the first through-hole and the second through-hole are located in the vicinity of the center of the vibrating plate 310. The vibration transmission unit 200 and the display panel 100 may be integrated. Like the first and second variants, the fourth variant has a configuration in which the vibration transmission unit 200 and the vibration actuator 300 are fixed to each other by the first and second screws 230A, 230B. In the fourth variant, the vibration transmission unit 200 and the vibration actuator 300 are fixed to each other by two screws (first screw 230A and second screw 230B) in order to suppress a bending vibration (flexural vibration) of the vibrating plate 310. Herein, it is assumed that a bending vibration in which the x-direction of the vibrating plate 310 is bowed in the z-direction occurs. That is, in FIG. 8, the bending vibration in which the x-direction of the vibrating plate 310 is bowed in the z-direction occurs by a voltage applied to the piezoelectric elements 320, 330. That is, the bending vibration is propagated in the x-direction of the vibrating plate 310. Herein, a plurality of through-holes are provided along the direction in which the bending vibration of the vibrating plate 310 is propagated. Due to the first and second through-holes and the first and second screws 230A, 230B, which are located on the straight line extending through the center of the vibrating plate 310 and parallel to the x-direction, vibration of the vibrating plate 310 can be efficiently transmitted to the display panel 100. If a bending vibration in which the y-direction of the vibrating plate 310 is bowed in the z-direction occurs, the first and second through-holes of the vibrating plate 310 may be provided on a straight line extending through the center of the vibrating plate 310 and parallel to the y-direction. Alternatively, the vibration transmission unit 200 and the vibration actuator 300 may be fixed to each other by two or more through-holes and two or more screws. If fixation is made at more locations along the propagation direction of the bending vibration, it is possible to disperse vibration modes and thus to more efficiently transmit vibration of the vibrating plate 310 to the display panel 100 over a wide band.

Figure 9:
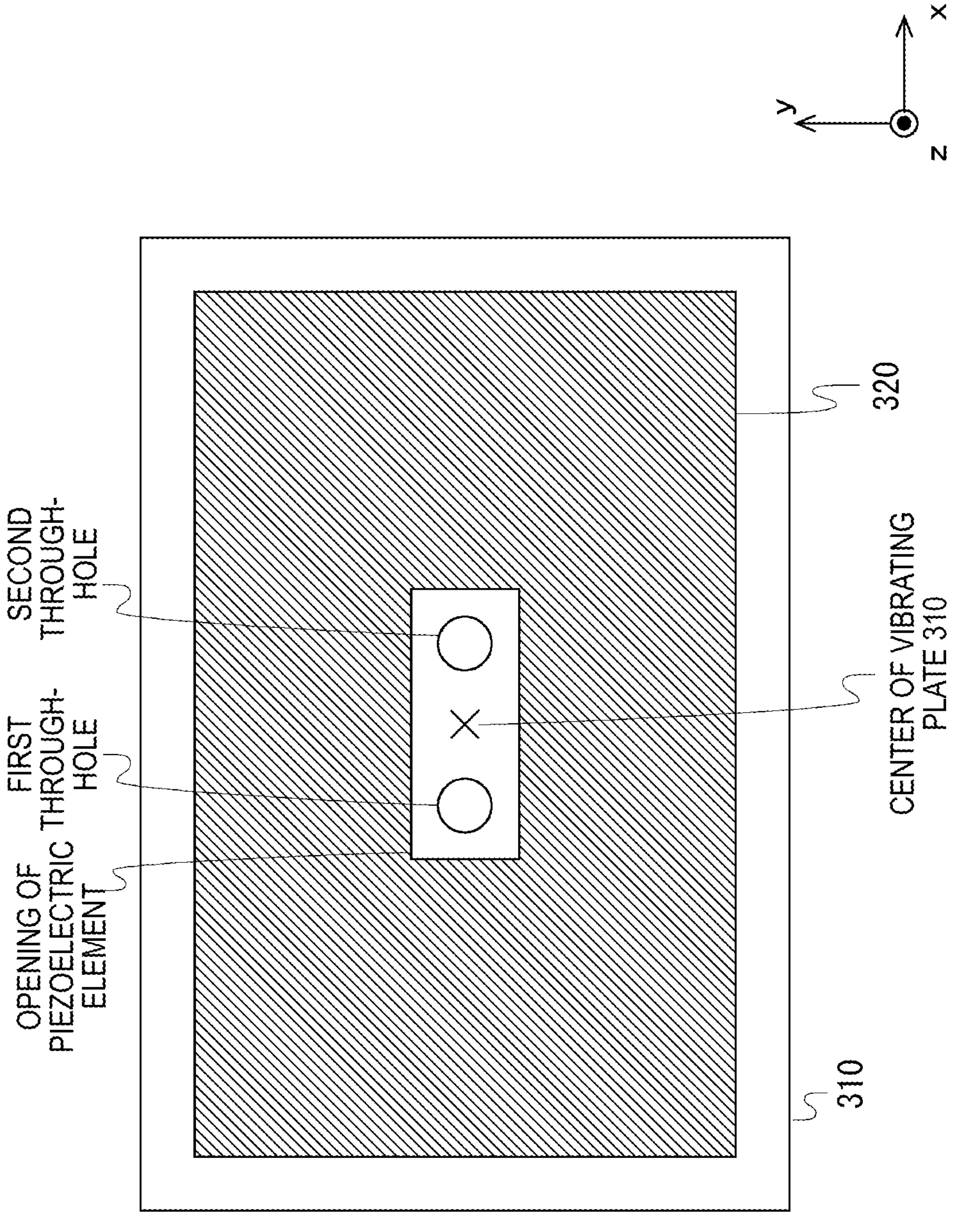
FIG. 9 is a view showing a configuration example of a vibration actuator 300 of the fourth variant.

FIG. 9 is a view showing a configuration example of the vibration actuator 300 of the fourth variant. FIG. 9 is a view of the vibration actuator 300 as viewed from the first surface side. The vibrating plate 310 of the vibration actuator 300 of the fourth variant has the first and second through-holes on the straight line extending through the center of the vibrating plate 310 and parallel to the x-direction. The piezoelectric element 320 has an opening formed to expose the first and second through-holes.

Operations and Effects of Embodiments

The display speaker 10 of the present embodiment includes the display panel 100, the vibration transmission unit 200 and the vibration actuator 300. The vibration actuator 300 includes the vibrating plate 310, the piezoelectric element 320 and the piezoelectric element 330. The vibration transmission unit 200 is fixed to the vibrating plate 310 without coming in contact with the piezoelectric elements 320, 330. According to the display speaker 10, the vibration transmission unit 200 does not come in contact with the piezoelectric elements 320, 330. Therefore, it is possible to suppress damage to the piezoelectric elements 320, 330, as compared with a configuration in which the piezoelectric elements 320, 330 are in contact with the vibration transmission unit 200. Also, according to the display speaker 10, the vibration actuator 300 and the vibration transmission unit 200 can be firmly coupled to each other.

Second Embodiment

Configuration Example

Figure 10:
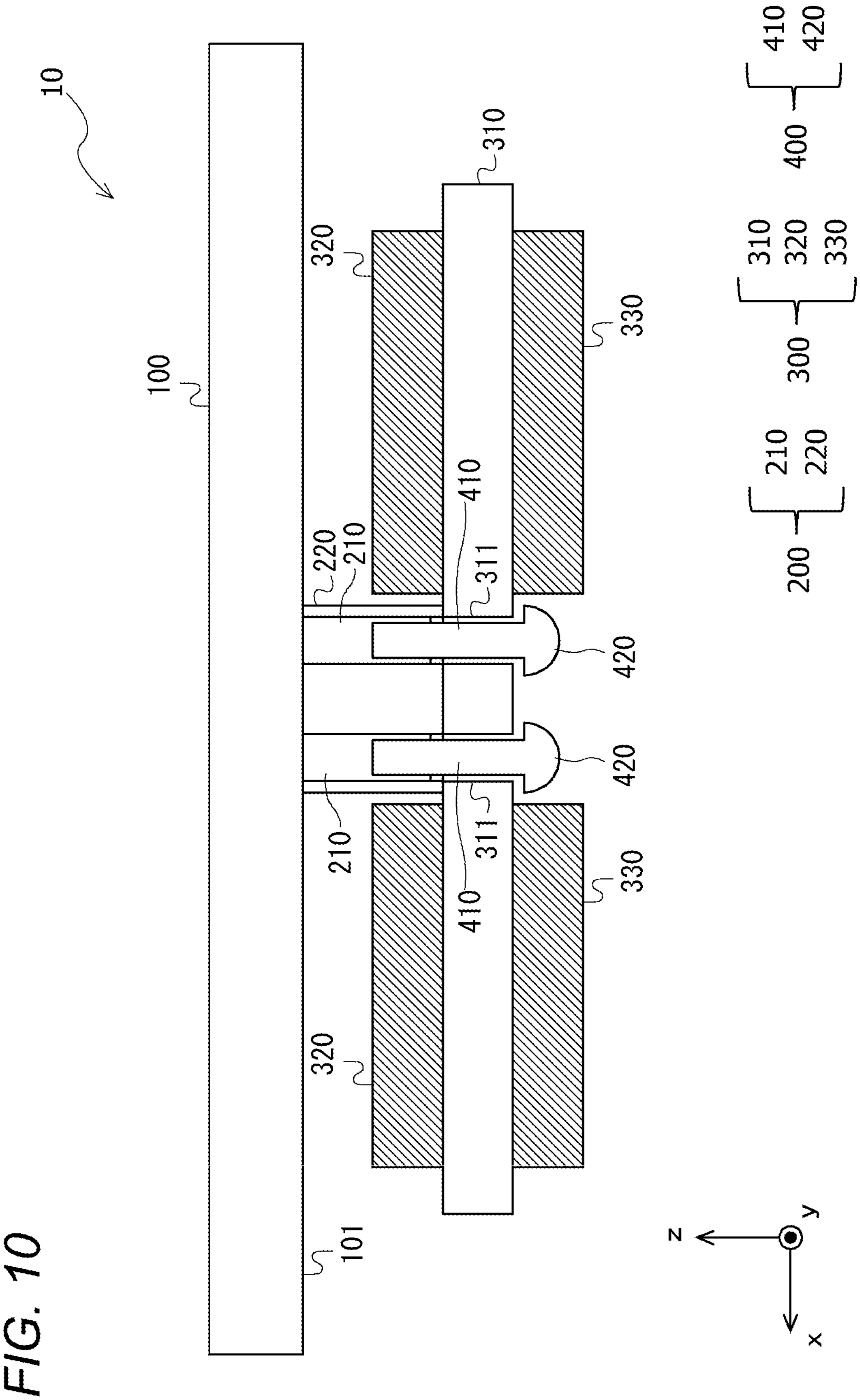
FIG. 10 is a view showing a configuration example of a display speaker of a second embodiment.
Figure 11:
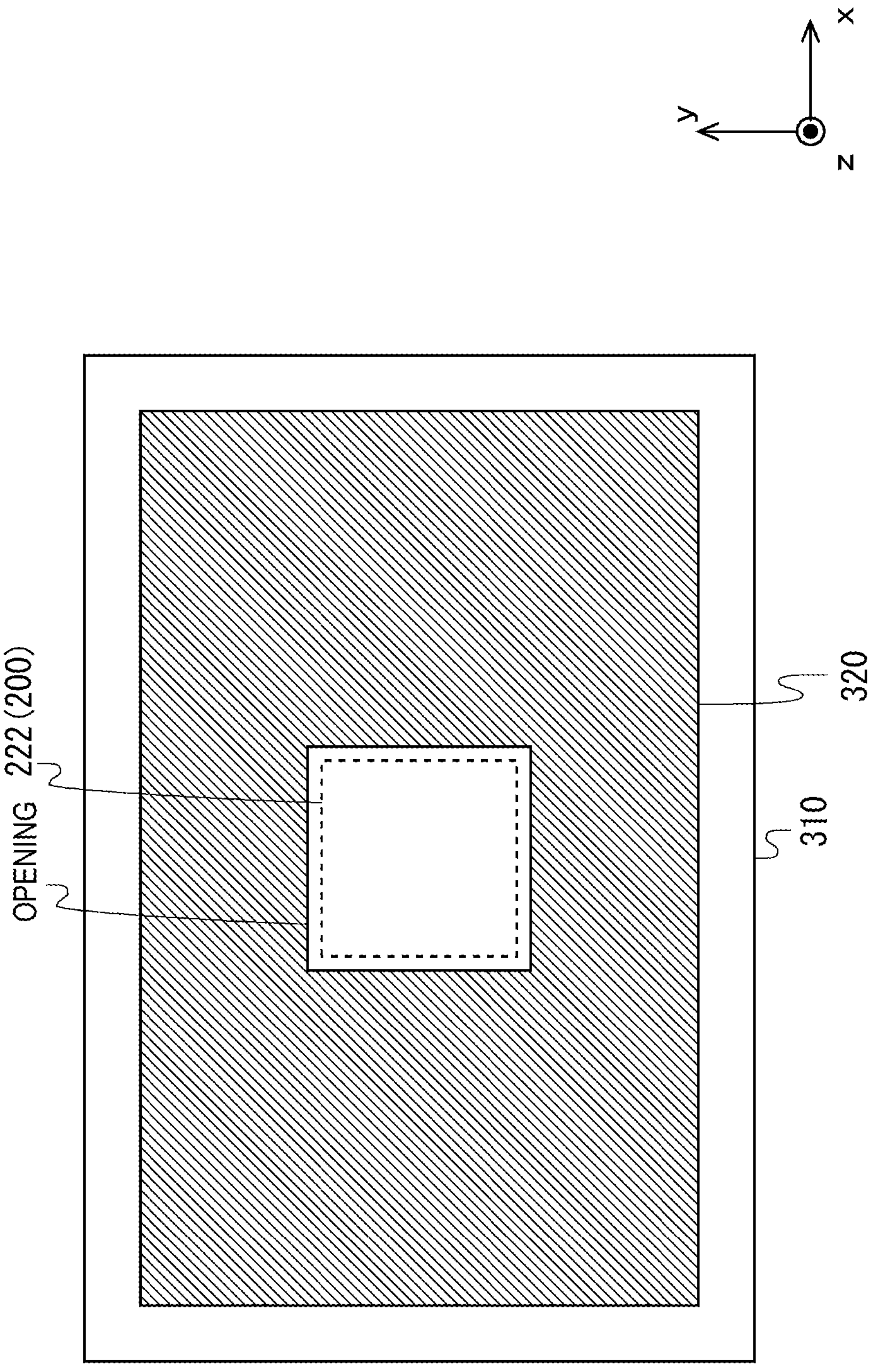
FIG. 11 is a view of an actuator as viewed from the display side (front surface side).
Figure 12:
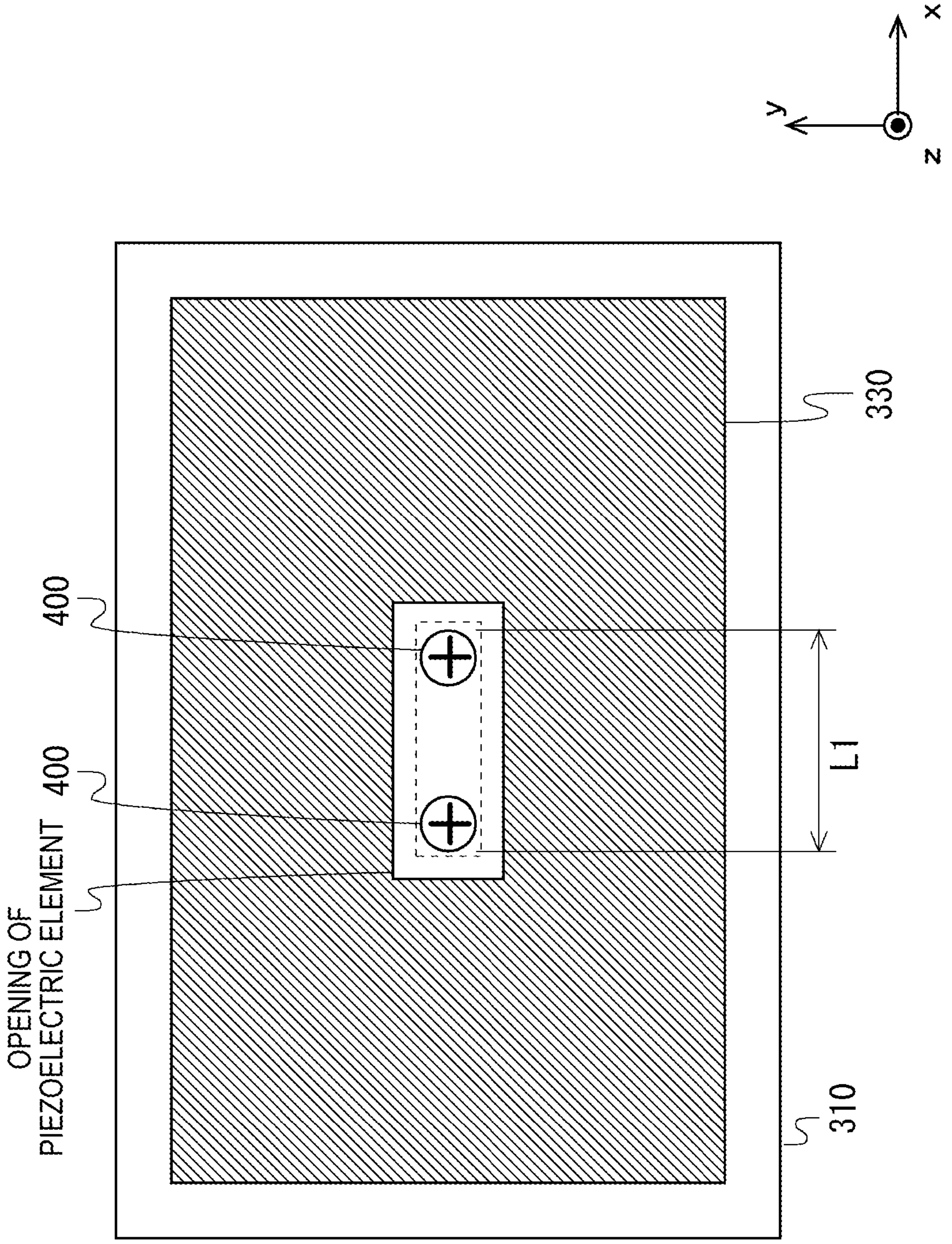
FIG. 12 is a view of the actuator as viewed from the back surface side.
Figure 13:
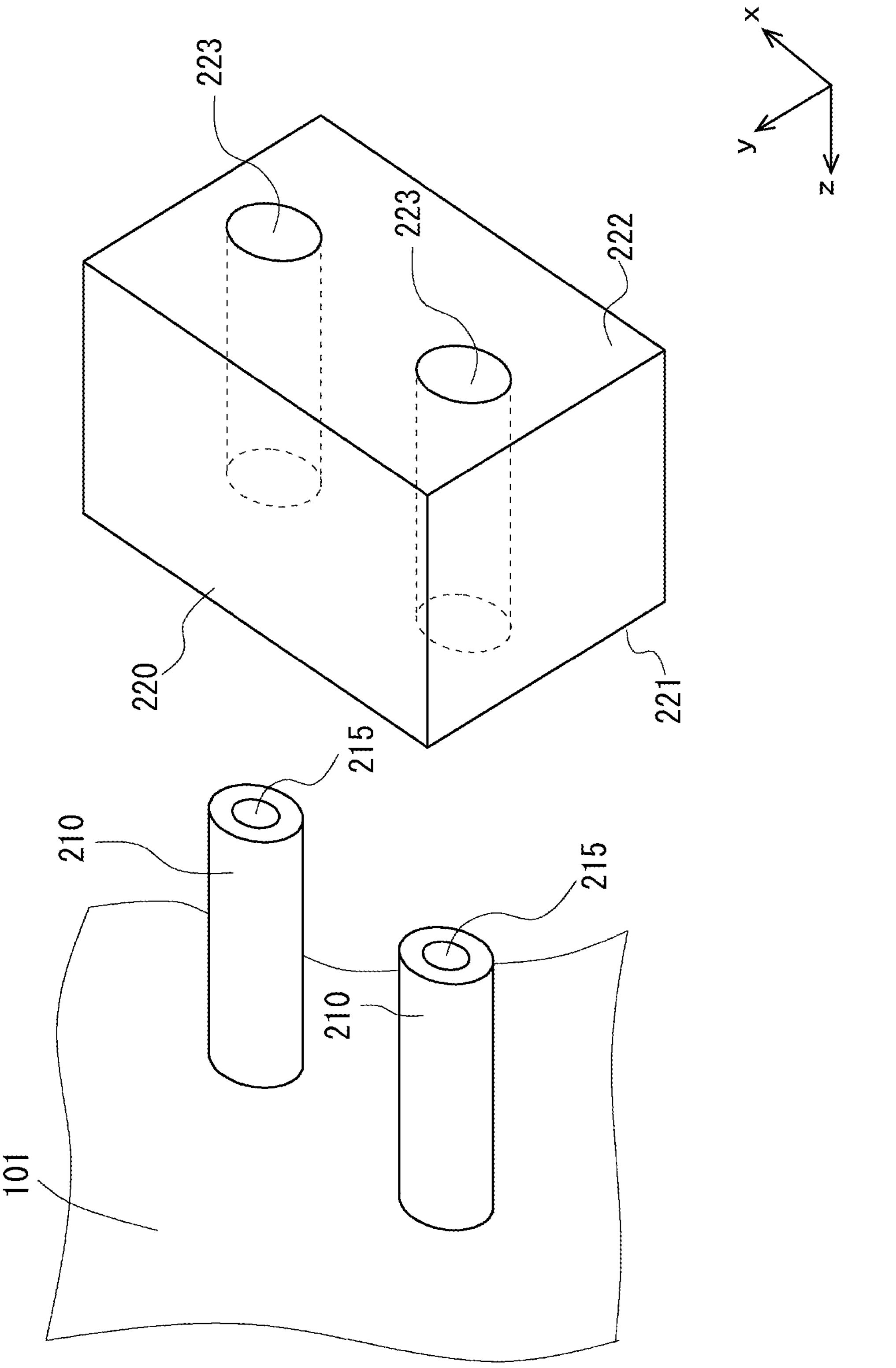
FIG. 13 is an exploded perspective view of a vibration actuator.

FIG. 10 is a view showing a configuration example of a display speaker 10 of the second embodiment. FIG. 10 is a sectional view of the display speaker 10 as viewed from above, FIG. 11 is a view of an actuator as viewed from the display side (front surface side), FIG. 12 is a view of the actuator as viewed from the rear surface side, and FIG. 13 is an exploded perspective view of a vibration transmission unit 200. The display speaker 10 of FIG. 10 includes a display panel 100, the vibration transmission unit 200, a vibration actuator 300, and a restraint unit 400. Here, a direction from the right to the left of FIG. 10 is referred to as an x-direction, a direction from a back surface to a front surface of the paper plane of FIG. 10 is referred to as a y-direction, and a direction from the bottom to the top of FIG. 10 (a direction from the vibration actuator 300 to the display panel 100) is referred to as a z-direction. The positional relationship between the display speaker 10 and the x-, y- and z-directions is similarly applied to the other figures. Meanwhile, these directions are shown for convenience of explanation, and the present embodiment is not limited to these directions. For example, the posture of the display panel 10 is not limited to these directions. The display panel 100 is an example of a panel. The display speaker is an example of a panel-type speaker. The vibration actuator 300 is an example of an actuator. An actuator attachment structure in the present embodiment includes the vibration transmission unit 200, the vibration actuator 300, and the restraint unit 400.

The display panel 100 is a display element included in a liquid crystal monitor, an organic EL (Electro-Luminescence) display and the like, and outputs a video when a video signal is input. The display panel 100 has a substantially flat plate shape, and the vibration actuator 300 is connected to a surface (rear surface) of the display panel 100 opposite to a video display surface (front surface) via the vibration transmission unit 200. The display panel 100 is an example of a target panel that is vibrated by the vibration actuator 300.

The vibration transmission unit 200 has one end connected to the display panel 100 and the other end connected to the vibration actuator 300, and transmits the vibration of the vibration actuator 300 to the display panel 100. The vibration transmission unit 200 has a screw receiving portion 210 (fastened portion), and a vibration transmission body 220 provided around the screw receiving portion 210. The screw receiving portion 210 is erected on a rear surface 101 of the display panel 100, and a female screw portion 215 to which the restraint unit 400 is attached is provided on a free end side of the screw receiving portion 210.

The vibration transmission body 220 has a substantially rectangular parallelepiped outer shape in which a display-side contact surface 221 in contact with a rear surface of the display panel 100 and an actuator-side contact surface 222 in contact with the vibration actuator 300 are provided in parallel. The vibration transmission body 220 has a hole 223 through which the screw receiving portion 210 is passed. The vibration transmission body 220 may have another outer shape as long as it has the display-side contact surface 221 and the actuator-side contact surface 222. For example, the vibration transmission body 220 may have a columnar shape such as a quadrangular column or a circular column. The vibration transmission unit 200 is made of, for example, resin, metal or the like.

In the present embodiment, the screw receiving portion 210, which is a part of the vibration transmission unit 200, is formed integrally with the display panel 100. However, the vibration transmission unit 200 is not limited to this and may be formed separately from the display panel 100 and fixed to the display panel 100 with an adhesive or double-sided tape.

The vibration actuator 300 includes a vibrating plate 310, a piezoelectric element 320 adhered to a surface of the vibrating plate 310 facing the display panel (referred to as a first surface), and a piezoelectric element 330 adhered to a surface of the vibrating plate 310 opposite to the first surface (referred to as a second surface). The vibrating plate 310 of the vibration actuator 300 is coupled to the display panel 100 via the vibration transmission unit 200.

The vibrating plate 310 of the vibration actuator 300 is a rectangular plate-shaped member in a plan view and has a front surface (first surface) arranged on a side facing the display panel and a back surface (second surface) opposite thereto. The shape of the vibrating plate 310 may be circular or elliptical. Also, the shape of the vibrating plate 310 may have another shape as long as it is laterally and vertically symmetrical. The front surface is substantially parallel to the back surface. Further, the vibrating plate 310 is arranged such that the front surface of the vibrating plate 310 is substantially parallel to the rear surface of the display panel 100.

The piezoelectric elements 320, 330 are piezoelectric elements configured such that when a voltage is applied thereto, a shape thereof is deformed in response to the voltage. For example, the piezoelectric elements 320, 330 are piezoelectric element made of a plate-shaped material, such as ceramic, which exhibits a piezoelectric effect. The piezoelectric elements 320, 330 have an electrode attached thereto for applying a voltage. The piezoelectric element 320 is adhered to the first surface of the vibrating plate 310. The piezoelectric element 330 is adhered to the second surface of the vibrating plate 310. The piezoelectric element 320 has an opening formed to expose a central portion of the vibrating plate 310 as viewed from the first surface side. The piezoelectric element 320 has an opening in a central portion thereof. The vibrating plate 310 has a portion (exposed portion) exposed at the central portion of the first surface of the vibrating plate 310 by the opening of the piezoelectric element 320. The actuator-side contact surface of the vibration transmission unit 200 is connected to the opening. At this time, the piezoelectric element 320 and the vibration transmission unit 200 do not come into contact with each other. On the other hand, one of the piezoelectric elements 320, 330 may be omitted. In the present embodiment, the first and second surfaces are on the x-y plane.

FIG. 11 is a view of the vibration actuator 300 as viewed from the first surface side. The piezoelectric elements 320, 330 having the openings are adhered to the first and second surfaces of the vibrating plate 310 of the vibration actuator 300. Also, the central portion of the vibrating plate 310 (portion including the centers of the first and second surfaces, the central portion in a plan view) is exposed through the openings of the piezoelectric elements 320, 330. Herein, if the shape of the vibrating plate 310 is rectangular, the center of the first surface (or the second surface) of the vibrating plate 310 is an intersection point of two diagonal lines of the rectangle. Further, if the shape of the vibrating plate 310 is circular or elliptical, the center of the first surface (or the second surface) of the vibrating plate 310 is the center of the circle or ellipse. Even if the vibrating plate 310 have any other shapes, the center of the first surface (or the second surface) of the vibrating plate 310 can be defined by, for example, a center of gravity thereof or the like.

A size of the opening of the piezoelectric element 320 (a size of the exposed portion of the vibrating plate 310) is larger than a size of the actuator-side contact surface 222 of the vibration transmission unit 200 in contact with the vibrating plate 310 (a portion encircled by a dotted line in FIG. 11). Therefore, the piezoelectric element 320 and the vibration transmission unit 200 do not come into contact with each other. Herein, although the shape of the opening of the piezoelectric element 320 is rectangular (or square), the shape may be circular or the like in accordance with the shape of the vibration transmission unit 200. In order to increase an area of the piezoelectric element 320, it is preferable to make the size of the opening of the piezoelectric element 320 as small as possible.

A size of the opening of the piezoelectric element 330 (a size of the exposed portion of the vibrating plate 310) is larger than a size of a region where the restraint unit 400 is arranged (a portion encircled by a dotted line in FIG. 12). Therefore, the piezoelectric element 330 and the restraint unit 400 do not come into contact with each other. Herein, although the shape of the opening of the piezoelectric element 330 is rectangular (or square), the shape may be circular or the like in accordance with the shape of the restraint unit 400. In order to increase an area of the piezoelectric element 330, it is preferable to make the size of the opening of the piezoelectric element 330 as small as possible.

By increasing the areas of the piezoelectric elements 320, 330, it is possible to make the output (maximum output) of the display speaker 10 larger. Also, as viewing the vibration actuator 300 from the first surface side and the second surface side, outer ends of the piezoelectric elements 320, 330 are preferably positioned inward of an end of the vibrating plate 310.

Also, a through-hole 311 is provided in the vicinity of the center of the vibrating plate 310 to allow the restraint unit 400 to pass therethrough.

The restraint unit 400 is a bolt (fastening member) having a male screw portion 410 and a head portion 420. In the examples of FIGS. 10 and 12, two restraint units 400 are used, and the male screw portions 410 thereof penetrate the through-holes 311 from the second surface side of the vibrating plate 310. The male screw portions 410 are screwed into the female screw portions 215 of the vibration transmission unit 200 and are tightened until the head portions 420 hit against the second surface of the vibrating plate 310. Therefore, the vibration transmission unit 200, the vibration actuator 300, and the restraint units 400 are fastened together. That is, the vibration actuator 300 is restrained by the restraint unit 400.

In the present embodiment, on the surfaces (the first surface and the second surface) of the vibrating plate 310 where the piezoelectric elements 320, 330 are provided, a direction along a longitudinal direction is defined as a specific direction (x-direction), and a restraint length (a length from an end of a restraint unit to an opposite end in the specific direction) L1 by the two restraint units 400 is set to be a predetermined length. This predetermined length is adjusted so that the resonance frequency of a bending vibration propagating in the plane of the vibrating plate 310 in the specific direction becomes a predetermined frequency. For example, the screw receiving portions 210 are provided at positions where the restraint length L1 by the restraint units 400 becomes a predetermined length.

In this way, even if the vibration actuator 300 resonates with the display panel 100 or the like and the sound of a specific resonance frequency is strengthened, the resonance frequency can be set to an appropriate value so that it is balanced in the entire frequency band of the sound output from the display panel 100. That is, an appropriate frequency characteristic can be obtained, rather than the sound of some frequencies protruding. Therefore, the resonance frequency can be set only by the length L1 of a restrained portion without changing the size of the display panel 100 or the vibration actuator 300, thereby obtaining an appropriate frequency characteristic with a simple configuration. For example, by setting the resonance frequency high, it is possible to reproduce high-pitched sound while ensuring sound pressure.

Further, when adjusting the resonance frequency in this specific direction, for example, the restraint length L1 by the restraint unit 400 may be set so that the resonance frequency of a bending vibration of the vibrating plate propagating in the x-direction (first direction) approaches the resonance frequency of a bending vibration propagating in the y-direction (second direction) orthogonal to the x-direction.

Therefore, even better frequency characteristic can be obtained in the entire frequency band of the sound output from the display panel 100.

(Fifth Variant)

Figure 14:
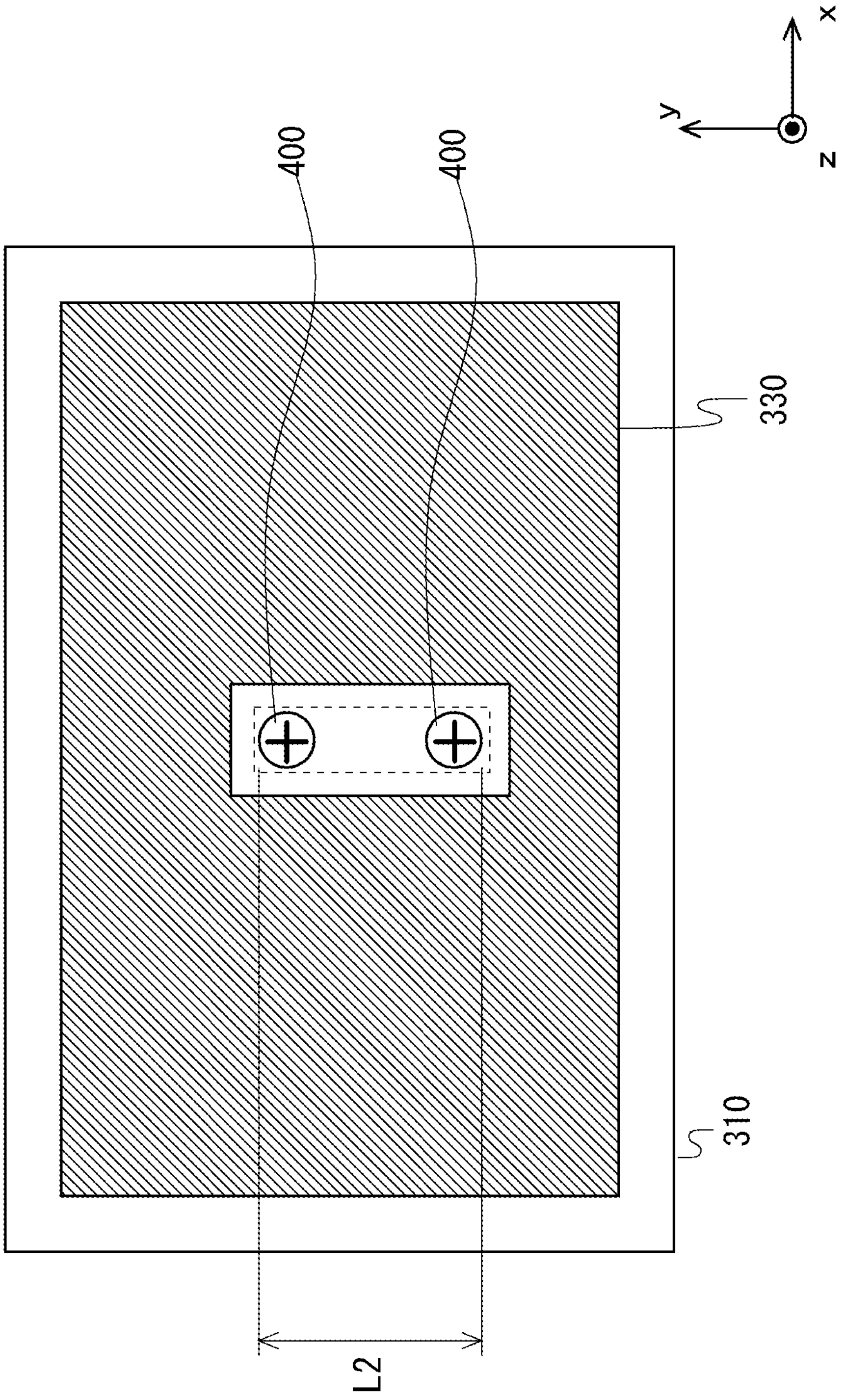
FIG. 14 is a view showing a configuration of a display speaker according to a fifth variant.

FIG. 14 is a view showing an actuator holding structure according to a fifth variant. This variant is different from the above-described second embodiment in the direction of restraint by the restraint unit 400. Meanwhile, since the other configurations are the same as those in the above-described second embodiment, the same elements are denoted by the same reference numerals and a repeated description thereof will be omitted.

In the above-described second embodiment, the longitudinal direction of the vibrating plate 310 is defined as the specific direction, and the resonance frequency in this direction is adjusted. However, in this variant, a width direction of the vibrating plate 310 is defined as the specific direction, and the resonance frequency in this direction is adjusted. That is, in this variant, two restraint units 400 are arranged in the y-direction along the surfaces (first and second surfaces) of the vibrating plate 310 where the piezoelectric elements 320, 330 are provided. Therefore, although not shown in the drawings, the screw receiving portions 210 to be fastened with these restraint units 400 are also arranged in the y-direction. Further, a restraint length L2 by the restraint units 400 is set to be a predetermined length. The predetermined length is adjusted so that the resonance frequency when the vibrating plate 310 bends and vibrates in the y-direction becomes a predetermined frequency.

Therefore, the resonance frequency when the vibrating plate 310 of the vibration actuator 300 bends and vibrates in the y-direction can be set to an appropriate value.

(Sixth Variant)

Figure 15:
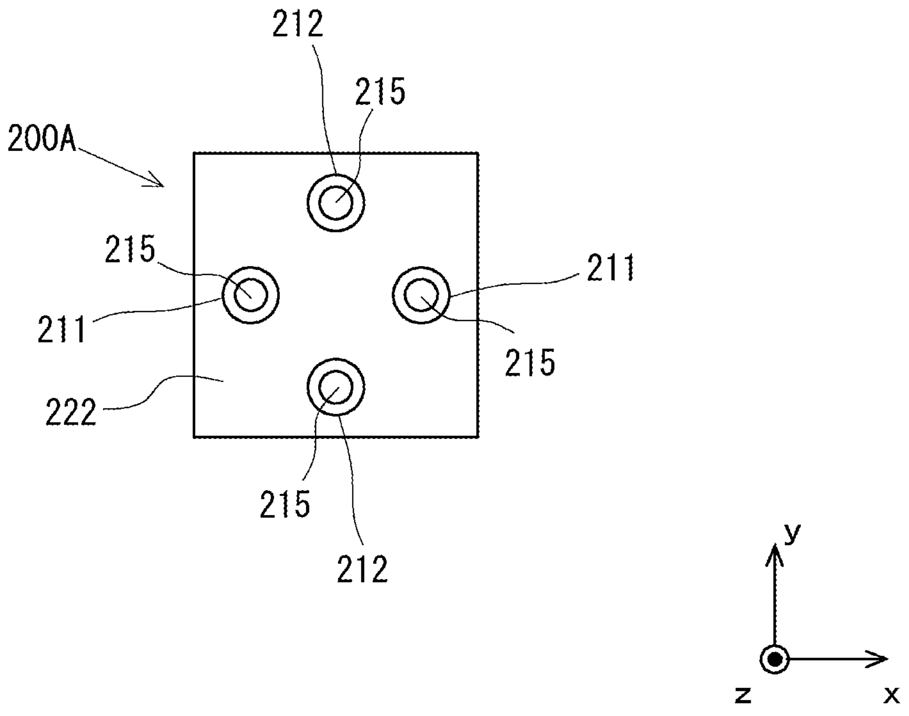
FIG. 15 is a view showing a configuration of a display speaker according to a sixth variant.
Figure 16:
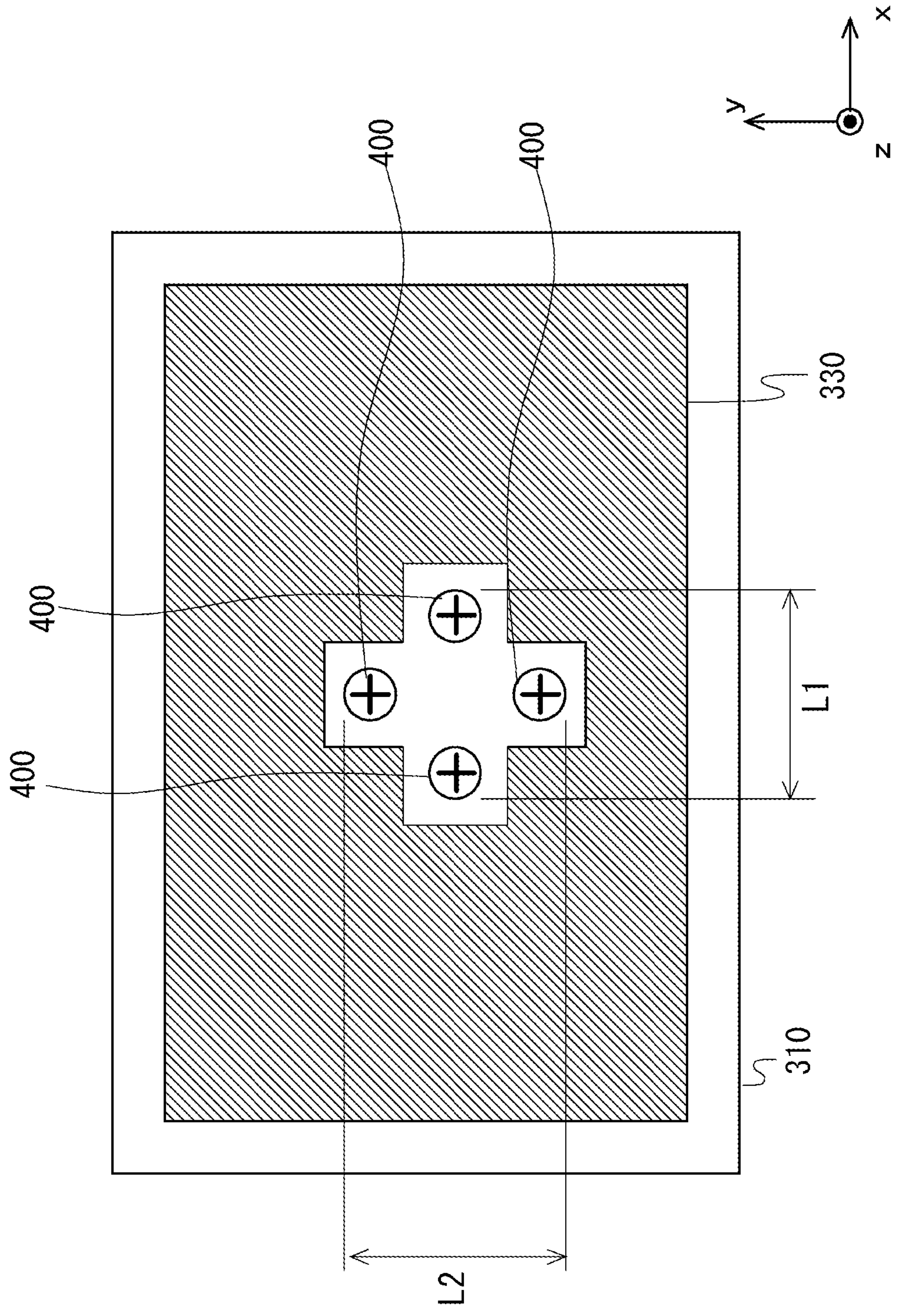
FIG. 16 is a view of a vibration transmission unit according to the sixth variant as viewed from the actuator side.

FIG. 15 is a view showing an actuator holding structure according to a sixth variant, and FIG. 16 is a view of a vibration transmission unit 200A according to the sixth variant as viewed from the actuator side. This variant is different from the above-described second embodiment in that the actuator is restrained in a plurality of directions by the restraint unit 400. Meanwhile, since the other configurations are the same as those in the above-described second embodiment, the same elements are denoted by the same reference numerals and a repeated description thereof will be omitted.

In the above-described second embodiment, the resonance frequency in the longitudinal direction (first direction) of the vibrating plate 310 is adjusted. However, in this variant, in addition to this, the resonance frequency in the width direction (second direction) of the vibrating plate 310 is adjusted. For this purpose, in this variant, as shown in FIG. 16, first screw receiving portions (fastened portions) 211 of the vibration transmission unit 200A are provided at two locations in the x-direction (first direction), and second screw receiving portions 212 are provided at two locations in the y-direction (second direction). Further, the restraint unit 400 is fastened to each of the screw receiving portions 210 (211, 212).

Herein, similarly to the above-described second embodiment and the fifth variant, the restraint length (first length) L1 by the restraint unit 400 in the x-direction and the restraint length (second length) L2 by the restraint unit 400 in the y-direction are set such that the resonance frequency when the vibrating plate 310 bends and vibrates in the x-direction or the y-direction has a predetermined value.

Therefore, the resonance frequency of the vibration actuator 300 in the x-direction can be set to an appropriate value, and the resonance frequency in the y-direction can be set to an appropriate value. For example, even if the vibrating plate has a shape close to a square with sides of approximately the same length in the x-direction and the y-direction or a shape close to a perfect circle with diameters of approximately the same length in the x-direction and the y-direction, the resonance frequencies in the x-direction and the y-direction can be set to different frequencies by setting the restraint length L1 and the restraint length L2 to different lengths. As a result, the sound output from the display panel 100 does not concentrate on a specific frequency, and good frequency characteristics can be obtained in the entire frequency band.

Also, the restraint unit (fastening member) 400 may be selectively fastened to the first screw receiving portions 211 arranged in the x-direction or the second screw receiving portion 212 arranged in the y-direction.

In this way, the restraint direction can be selected, and the resonance frequency in the x-direction and the resonance frequency in the y-direction can be selectively adjusted. Therefore, even if the vibration actuator 300 having the same specifications is connected to the display panels 100 having different aspect ratios, the frequency characteristic can be set appropriately. As a result, the vibration actuator 300 used in different products can be shared, and for example, the procurement of the vibration actuator 300 can be facilitated.

(Seventh Variant)

Figure 17:
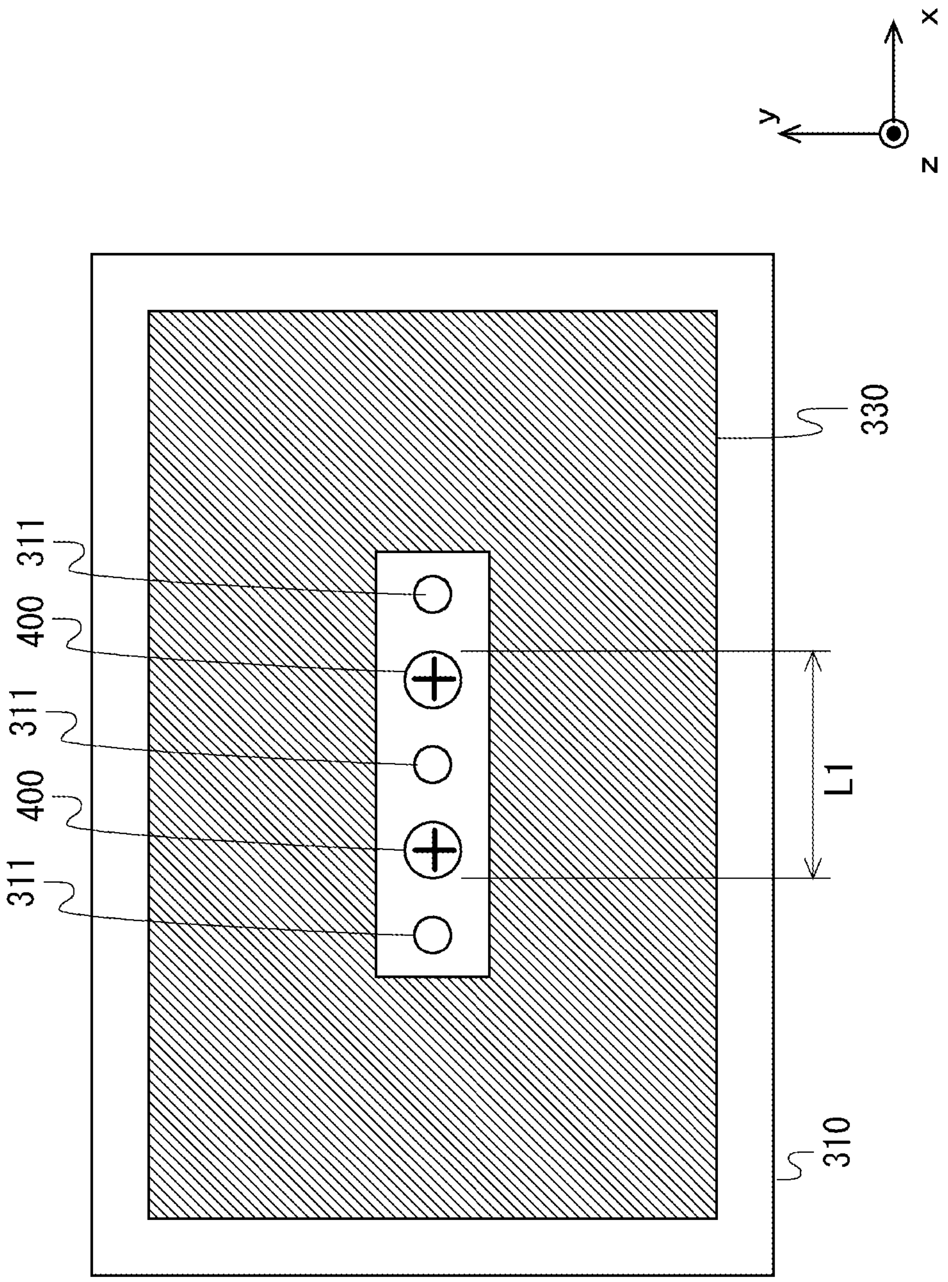
FIG. 17 is a view showing a configuration of a display speaker according to a seventh variant.
Figure 18:
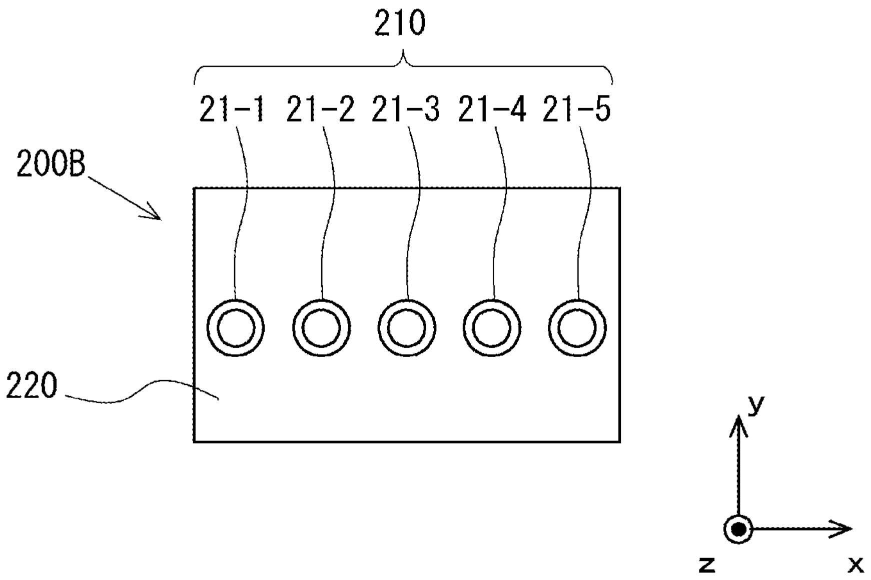
FIG. 18 is a view of a vibration transmission unit according to the seventh variant as viewed from the actuator side.

FIG. 17 is a view showing an actuator holding structure according to a seventh variant, and FIG. 18 is a view of a vibration transmission unit 200B according to the seventh variant as viewed from the actuator side. This variant is different from the above-described second embodiment in that the restraint length L1 by the restraint unit 400 can be adjusted. Meanwhile, since the other configurations are the same as those in the above-described second embodiment, the same elements are denoted by the same reference numerals and a repeated description thereof will be omitted.

In the above-described second embodiment, the restraint units 400 are provided at two locations of the vibrating plate 310 in a specific direction (x-direction). However, in this variant, as shown in FIG. 18, the vibration transmission unit 200B has the screw receiving portions 210 (21-1 to 21-5) at five locations in a specific direction (x-direction), and the restraint units 400 are selectively fastened to two of these locations. Meanwhile, the number of the screw receiving portions 210 is not limited to this and may be three or more.

According to this variant, the resonance frequency in the x-direction can be arbitrarily adjusted by adjusting the restraint length by the restraint units 400 fastened to the five screw receiving portions 21-1 to 21-5. For example, compared to the case where the restraint units 400 are fastened to the screw receiving portion 21-2 and the screw receiving portion 21-4, the restraint length is longer and the resonance frequency can be set high when the restraint units 400 are fastened to the screw receiving portion 21-1 and the screw receiving portion 21-5.

Therefore, the resonance frequency can be arbitrarily adjusted according to the usage environment of the display speaker 10 and the preference of the user. Also, even if the vibration actuator 300 having the same specifications is connected to the display panels 100 having different sizes and aspect ratios, the optimum restraint length can be selected according to the size of the display panel 100 and the like, and the frequency characteristic can be set appropriately. As a result, the vibration actuator 300 used in different products can be shared, and for example, the procurement of the vibration actuator 300 can be facilitated.

Meanwhile, by applying this variant when the screw receiving portions 210 are arranged in the x-direction and the y-direction as in the above-described sixth variant, the screw receiving portions 210 may be provided at three or more locations in each of the x-direction and the y-direction to adjust the restraint length in the x-direction and the y-direction.

Third Embodiment

Figure 19:
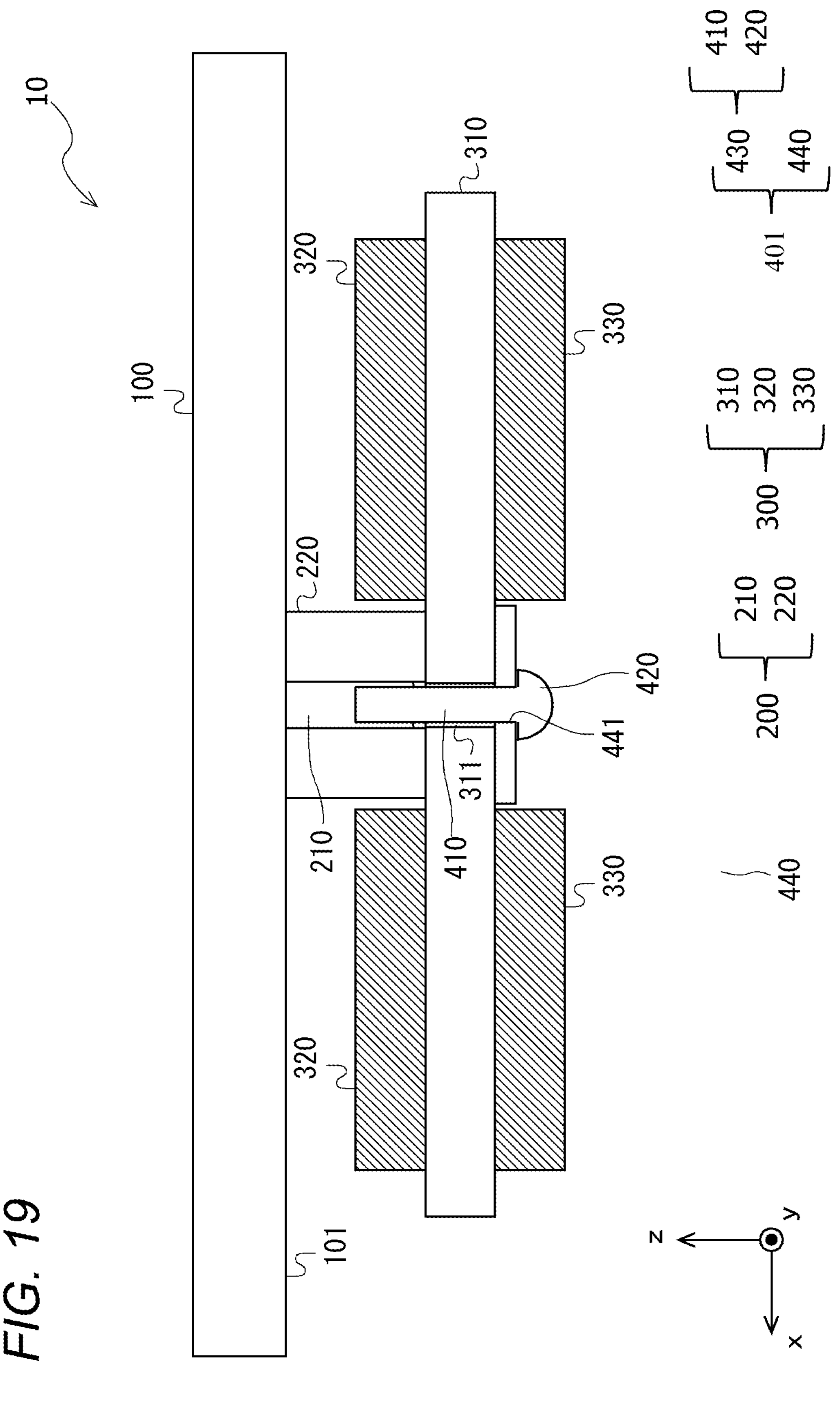
FIG. 19 is a view showing a configuration of a display speaker according to a third embodiment.
Figure 20:
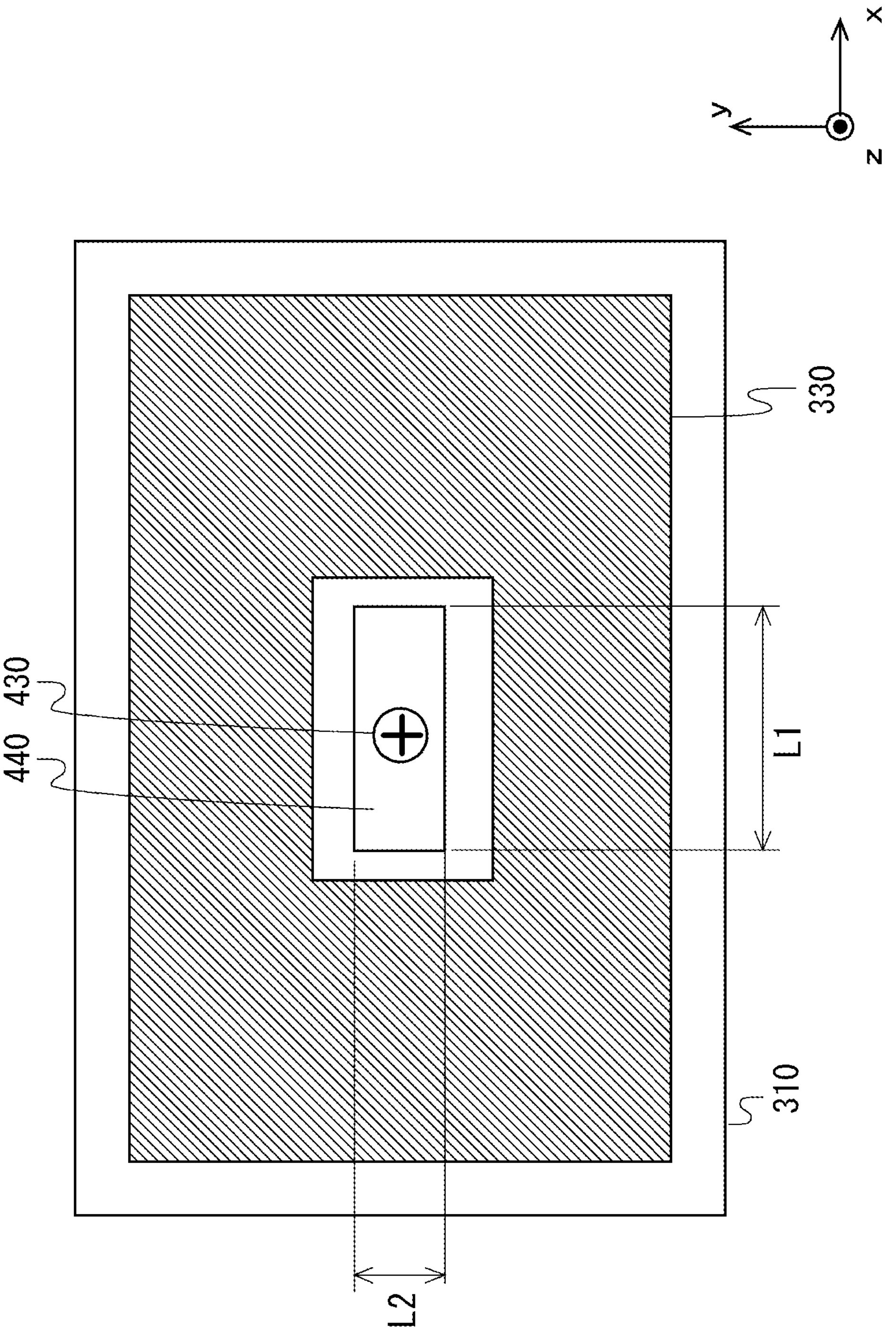
FIG. 20 is a view of the display speaker according to the third embodiment as viewed from the back surface side.

FIG. 19 is a view showing an actuator holding structure according to the third embodiment, and FIG. 20 is a view of the actuator holding structure according to the third embodiment as viewed from the rear surface side. The present embodiment is different from the above-described second embodiment in that a restraint unit 401 includes a fastening member 430 and a spacer 440, and the restraint length is set by a width (length) of the spacer 440. Meanwhile, since the other configurations are the same as those in the above-described second embodiment, the same elements are denoted by the same reference numerals and a repeated description thereof will be omitted.

The spacer 440 is a flat plate-shaped member and has a through-hole 441 to allow the fastening member 430 to pass therethrough in a thickness direction (z-direction in the drawing). The spacer 440 is made of synthetic resin or metal and is configured to be capable of restraining the vibrating plate 310.

In the display panel 100 of the present embodiment, one screw receiving portion 210 is erected in the center of the rear surface. Similarly, the through-hole 311 to allow the fastening member 430 to pass therethrough is provided at one location in the center of the vibrating plate 310.

Further, as shown in FIGS. 19 and 20, the male screw portion 410 of the fastening member 430 penetrates the through-hole 441 and the through-hole 311 of the vibrating plate 310 from the rear surface side of the spacer 440. The male screw portion 410 is screwed into the female screw portion 215 of the screw receiving portion 210 and is tightened until the head portion 420 hits against the rear surface of the spacer 440. Therefore, the vibration transmission unit 200, the vibration actuator 300, the spacer 440, and the fastening member 430 are fastened together. That is, the vibration actuator 300 is restrained by the spacer 440 of the restraint unit 401.

In the present embodiment, the length L1 in the first direction (x-direction) and the length L2 in the second direction (y-direction) of the spacer 440 provided along the surface (second surface) of the vibrating plate 310 where the piezoelectric element 330 is provided are set to have predetermined lengths, respectively.

According to the present embodiment, with the lengths L1 and L2 of the spacer 440, the resonance frequency of the vibration actuator 300 in the x-direction can be set to an appropriate value and the resonance frequency in the y-direction can be set to an appropriate value. For example, the resonance frequency in the x-direction and the y-direction may be adjusted by preparing a plurality of types of spacers 440 having different lengths L1, L2 and selecting the spacer 440 having a desired resonance frequency.

Therefore, even if even if the vibration actuator 300 having the same specifications is connected to the display panels 100 having different sizes and aspect ratios, the optimum restraint length can be selected according to the size of the display panel 100 and the like, and the frequency characteristic can be set appropriately. As a result, the vibration actuator 300 used in different products can be shared, and for example, the procurement of the vibration actuator 300 can be facilitated.

(Eighth Variant)

Figure 21:
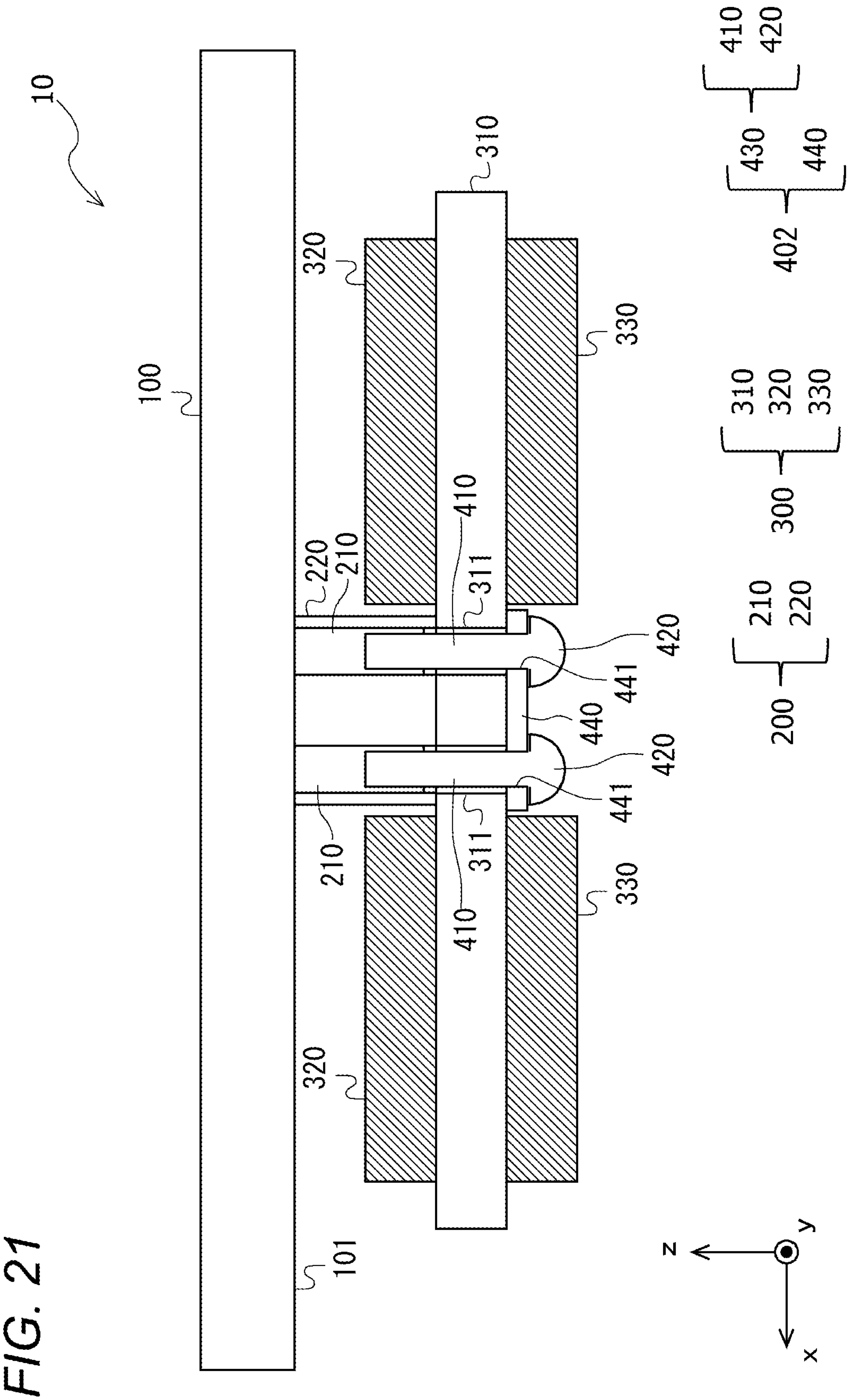
FIG. 21 is a view showing a configuration of a display speaker according to an eighth variant.
Figure 22:
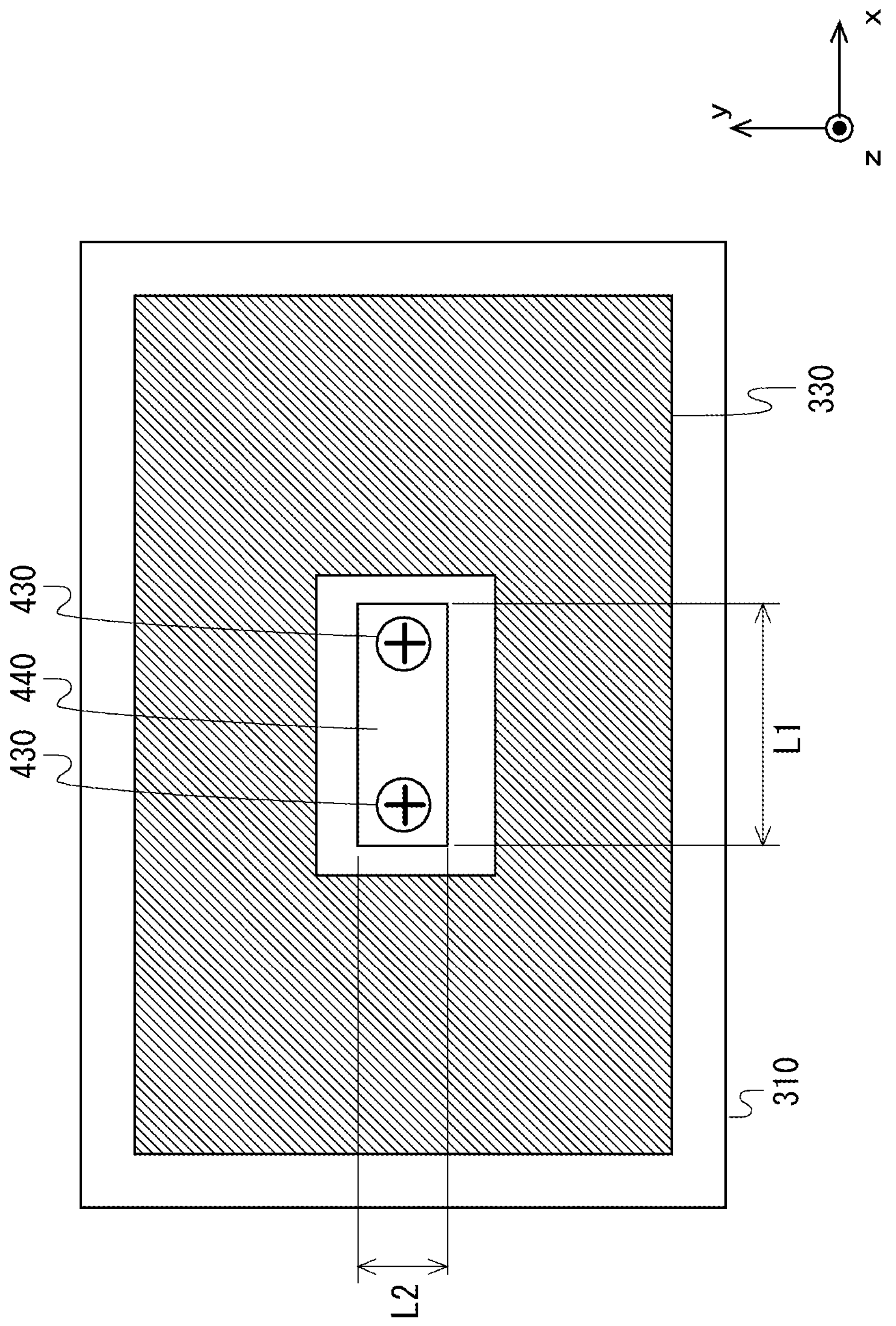
FIG. 22 is a view of the display speaker according to the eighth variant as viewed from the back surface side.

FIG. 21 is a view showing an actuator holding structure according to an eighth variant and FIG. 22 is a view of the actuator holding structure according to the eighth variant as viewed from the rear surface side. This variant is different from the above-described third embodiment in that a plurality of fastening members 430 are provided in a restraint unit 402. Meanwhile, since the other configurations are the same as those in the above-described third embodiment, the same elements are denoted by the same reference numerals and a repeated description thereof will be omitted.

In the present variant, similarly to the example of FIG. 10, the two screw receiving portions 210 are erected in the vicinity of the center of the rear surface of the display panel 100, and the fastening members 430 are fastened to the screw receiving portions 210, respectively. The male screw portions 410 of the fastening members 430 penetrate the through-holes 441 and the through-holes 311 of the vibrating plate 310 from the rear surface side of the spacer 440. The male screw portions 410 are screwed into the female screw portions 215 of the screw receiving portions 210 and are tightened until the head portions 420 hit against the rear surface of the spacer 440.

Therefore, the vibration transmission unit 200, the vibration actuator 300, the spacer 440, and the fastening members 430 are fastened together. That is, the vibration actuator 300 is restrained by the spacer 440 of the restraint unit 402.

According to this variant, similarly to the above-described third embodiment, with the lengths L1 and L2 of the spacer 440, the resonance frequency of the vibration actuator 300 in the x-direction and the y-direction can be set and an appropriate frequency characteristic can be obtained. Therefore, for example, when it is desired to share the display speaker 10 and the vibration actuator 300 of the second embodiment and to set a resonance frequency other than the frequency determined by the restraint length by the restraint unit 400 as in the second embodiment, the spacer 440 may be added and the resonance frequency may be set according to the lengths L1 and L2 of the spacer 440, as in this variant.

Although embodiments of this invention have been described above, the embodiments are illustrated by way of example only. Accordingly, the present invention is not limited thereto, and various modifications can be made based on the knowledge of those skilled in the art without departing from the scope of the claims.

What is claimed is:

1. A panel-type speaker which comprises:

an actuator including (i) a vibrating plate and (ii) a piezoelectric element that is arranged on at least one surface of the vibrating plate and is capable of causing a bending vibration to the vibrating plate;

a panel capable of outputting sound waves by being vibrated by the actuator;

a vibration transmission unit that has one end connected to the panel and another end connected to the actuator and is configured to transmit a vibration of the actuator to the panel;

a spacer configured to hold the actuator by sandwiching the actuator between the spacer and the vibration transmission unit; and fastening members for fastening the spacer to the vibration transmission unit, wherein the spacer has a contacting surface with the vibrating plate, the contacting surface having a shape in which, in a plan view of the vibrating plate, (i) a length of the contacting surface in a direction along a propagating direction of a bending vibration propagating in a plane of the vibrating plate is longer than (ii) a length of the contacting surface in a direction along a direction orthogonal to the propagating direction, and wherein the spacer is fastened to the vibration transmission unit by the fastening members in at least two locations along the propagating direction.

2. The panel-type speaker according to claim 1, wherein the contacting surface of the spacer has a rectangular shape in the plan view of the vibrating plate.

3. The panel-type speaker according to claim 1, wherein the vibrating plate is rectangular in the plan view, and the propagating direction is a direction along a longitudinal direction of the vibrating plate in the plan view.

4. The panel-type speaker according to claim 1, wherein the vibration transmission unit and the spacer have at three or more locations along the propagating direction fastened parts to which the fastening members are to be fastened, and two of the fastened parts are fastened by the fastening members.

* * * * *